(12) United States Patent
Dolgin et al.

(10) Patent No.: US 8,072,220 B2
(45) Date of Patent: Dec. 6, 2011

(54) POSITIONING, DETECTION AND COMMUNICATION SYSTEM AND METHOD

(75) Inventors: Benjamin P. Dolgin, Alexandria, VA (US); Michael Shore, Chapel Hill, NC (US); Steven A. Cotten, Dumfries, VA (US); Craig E. Matter, Ashburn, VA (US); Kenneth D. Kuck, Fairfax, VA (US); Luis B. Giraldo, Fairfax, VA (US); John T. Ishibashi, Burke, VA (US)

(73) Assignee: Raytheon UTD Inc., Springfield, VA (US)

( * ) Notice: Subject to any disclaimer, the term of this patent is extended or adjusted under 35 U.S.C. 154(b) by 869 days.

(21) Appl. No.: 12/078,069

(22) Filed: Mar. 26, 2008

(65) Prior Publication Data

US 2009/0009410 A1 Jan. 8, 2009

Related U.S. Application Data

(63) Continuation-in-part of application No. 11/640,337, filed on Dec. 18, 2006.

(60) Provisional application No. 60/750,787, filed on Dec. 16, 2005.

(51) Int. Cl.
*G01V 3/10* (2006.01)
*G01N 27/72* (2006.01)

(52) U.S. Cl. ........................... 324/329; 324/228

(58) Field of Classification Search .................. 324/228, 324/329
See application file for complete search history.

(56) References Cited

U.S. PATENT DOCUMENTS

| | | | |
|---|---|---|---|
| 3,471,777 A | 10/1969 | Rona | |
| 5,442,294 A | 8/1995 | Rorden | |
| 5,646,525 A | 7/1997 | Gilboa | |
| 6,657,577 B1* | 12/2003 | Gregersen et al. | 342/22 |
| 7,075,482 B2* | 7/2006 | Karlsson | 342/417 |
| 2005/0077085 A1 | 4/2005 | Zeller et al. | |
| 2005/0212520 A1* | 9/2005 | Homan et al. | 324/338 |
| 2008/0036652 A1 | 2/2008 | Shore et al. | |

OTHER PUBLICATIONS

International Search Report and Written Opinion of the International Searching Authority, Sep. 2010.

* cited by examiner

*Primary Examiner* — Bot Ledynh
(74) *Attorney, Agent, or Firm* — Dickstein Shapiro LLP

(57) ABSTRACT

A positioning, communication, and detection system designed to provide a three dimensional location of an object, navigation tools, and bidirectional surface-to-subsurface communications, and methods of using the system. The system can include one or multiple transmitters comprising electromagnetic beacons, software defined radio receivers with an associated processing unit and data acquisition system, and magnetic antennas. The system may use theoretical calculations, scale model testing, signal processing, and sensor data.

16 Claims, 17 Drawing Sheets

POSITIONING, DETECTION AND COMMUNICATION SYSTEM AND METHOD

This application is a continuation in part of U.S. patent application Ser. No. 11/640,337, filed on Dec. 18, 2006, which claims the benefit of U.S. Provisional Patent Application Ser. No. 60/750,787, filed on Dec. 16, 2005, the entire disclosure of each is incorporated herein by reference.

GOVERNMENT RIGHTS

Part of the work performed during development of this invention utilized U.S. Government funds. The U.S. Government may have certain rights in the invention.

FIELD OF THE INVENTION

The disclosed embodiments relate generally to methods and devices pertaining to a positioning, detection and communication system.

BACKGROUND

Geological mapping and geophysical surveying on the earth's surface are mature sciences with a history of technology enhancements that improved the fidelity of understanding of the Earth, above and beneath the surface. Yet when conventional techniques are employed in an underground environment, geo-location has proven a challenge that drives concepts of operations to bootstrap techniques to geo-locate instrumentation and geological contacts and can actually limit the effectiveness of employed technologies.

Conventional mapping and survey systems, such as a Global Positioning System (GPS), determine the location of objects using satellite signals. However, a longstanding problem exists with determining location of personnel and equipment within, for example, underground facilities without the use of surveying. To date, this problem has not been resolved because of the difficulty of signaling/communicating between the Earth's surface and underground facilities/caverns/mines and the complexity of electromagnetic propagation within the Earth.

Lower fidelity very low frequency systems are currently in development in Europe to support communications for cave rescue operations. The systems only obtain a shallow depth position when the communication system is used underground. These communications systems are effective up to 600 m and occasionally up to 1,200 m. The systems are also used to locate underground transmitters at comparable depths. In controlled experiments, they have achieved an accuracy of 2% in horizontal position and only 5% in depth.

The typical means of providing time base synchronization between a transmitter and receiver used for navigation purposes has been to either (1) provide a uniform time radio reference signal from an independent source (GPS or VLF signal) or (2) provide each transmitter and receiver with its own highly accurate and stable timing mechanism which are then mutually synchronized at the beginning of the period of interest. In underground environments, GPS and VLF signals are either unavailable or unreliable. Providing each device with its own stable time base may be expensive, cumbersome, and wasteful of limited available power supply.

Normal radio frequency wireless communications to/from a sub-surface receiver by a surface transmitter have been unavailable due to the electrical properties of ground, soil and rock. Communications beyond a depth of 100 meters is particularly difficult. A system that provides wireless contact between subterranean and surface locations will be desirable. Particularly such a system that could provide accurate positioning, detection and communications between the Earth's surface and sub-surface.

SUMMARY

The system provides a means for location determination in the underground, determination of subterranean masses, and surface-to-subsurface communications. This development is made possible through the assembly of sensor technologies and processing capabilities that are currently evolving at the state-of-the-art in several diverse arenas.

The system can provide individuals and equipment moving within a space, either above or below ground, the capability to know their location in three dimensions. The system identifies the location of an object by applying theoretical calculations, and novel technology demonstrations including state-of-the-art signal processing, fusion of multiple sensor data, and unique concepts of operation, which include magnetic beacons and special Software Defined Radio (SDR) receivers to determine the location of an object, above or below ground. A back channel communications capability is provided.

An exemplary embodiment of the system uses multiple transmitters on the surface, in the vicinity of an underground space, to provide magnetic beacons. The signal processing can be supplemented with distant signals of opportunity, both cooperative and uncooperative. The SDR receiver carried underground can measure angles between various transmitters. The surface transmitter locations can be determined when deployed and the magnetic radiation field can be calculated so that the underground receiver location can be determined.

An inertial guidance unit can be included as a part of the processing unit to provide a stable reference as a stop-gap navigation capability. In addition to the SDR receiver and inertial guidance unit, disclosed embodiments can employ accelerometers/tilt measurement devices, magnetic compass, microbarograph, ranging on the back channel communications system, and automated pacing/velocity devices.

Multiple magnetic dipoles spinning around an axis can be used to provide measurements allowing position calculations without requiring a particular receiver orientation. A magnetic core antenna can be provided to increased transmitter range so as to allow for surface-to-subsurface bidirectional communications.

These and other features of the disclosed embodiments will be better understood based on a reading of the Detailed Description below, in view of the figures, which are a part of this specification.

DETAILED DESCRIPTION

In the following detailed description, reference is made to the accompanying drawings, which form a part hereof and show by way of illustration specific embodiments in which disclosed embodiments may be practiced. These embodiments are described in sufficient detail to enable those skilled in the art to practice the disclosed embodiments, and it is to be understood that other embodiments may be utilized, and that structural, logical, and other changes may be made without departing from the spirit and scope of the presently disclosed embodiments.

Figure 1:
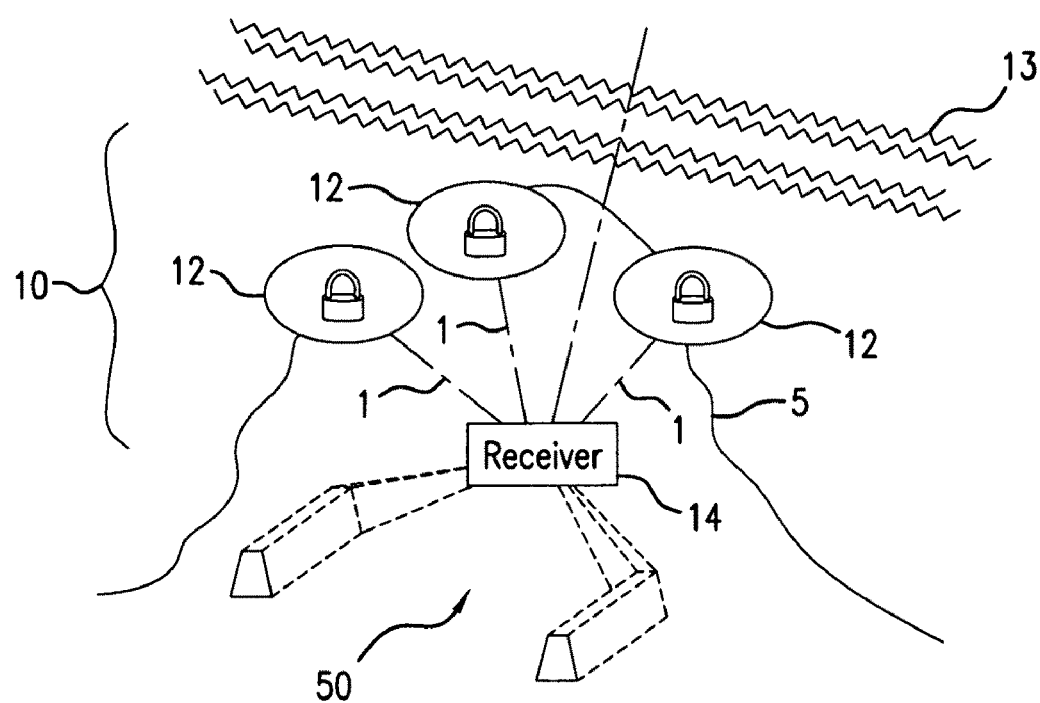
FIG. 1 shows a positioning system architecture.

An exemplary positioning system 10 is shown in FIG. 1. The positioning system 10 is comprised of a number of components, which can include transmitters 12 (as used herein, the terms "transmitter" and "beacon" are interchangeable) and a SDR unit 14 ("receiver"). Additional signals of opportunity 13, such as from other transmitters in the very low/low/medium frequency range and AM radio signals, can also be exploited as additional signal sources, as will be explained further below.

Figure 2:
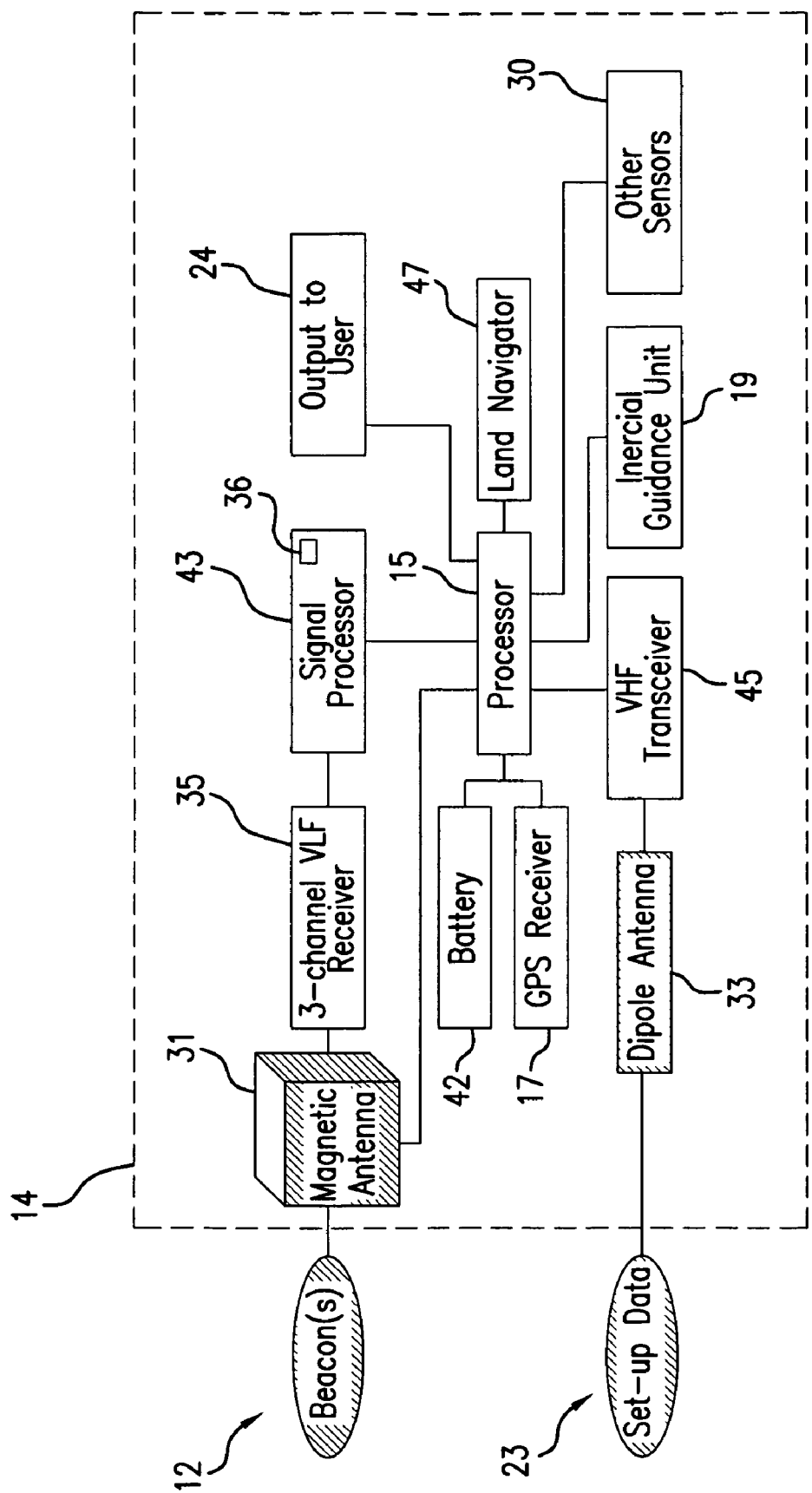
FIG. 2 shows a block diagram of a software defined radio receiver according to an embodiment.

FIG. 2 shows a block diagram of a receiver 14. The receiver 14 comprises a sensitive, three-component magnetic receiver capable of accurately detecting the magnetic field vectors emanating from the transmitters 12, a processing unit 15, a power source 42, a GPS receiver 17, an inertial guidance unit 19, a magnetic antenna 31, a dipole antenna 33, a signal processor 43, a VHF transceiver 45, a land navigator system 47, and additional secondary sensors 30 (e.g., magnetic compass, accelerometers, tiltmeters, microbarometer).

The processing unit 15 processes data received by the three-channel VLF receiver 35, the dipole antenna 33, and secondary sensors 30 to provide a three-dimensional location of the receiver 14, either below or above ground. The inclusion of the GPS receiver 17 allows the receiver 14 to interface with an existing GPS-based land navigation unit and provide full integration with surface geographic information systems and databases. The processing unit 15 output 24 may be accordingly configured so that existing land navigation options for display and user interface are preserved and underground locations obtained from the positioning system 10 smoothly transition from GPS locations determined during times that the receiver 14 is above the Earth's surfaces 5.

The processor 15 can also store reference locations of each of the transmitters 12, as well as the surveyed information about the signals of opportunity 13. These data can be used in estimating the current position of the user. GPS locations of the entry points are used to provide the "truth" for the starting positions. The outputs from the microbarometer (part of secondary sensors 30) of the receiver 14 can also be used to provide incremental update and error correction for elevation estimates. Using this data, the computed location can be continually updated on the display output 24.

Magnetic fields induced by the transmitters 12 are detected by the receiver's 14 magnetic antenna 31. A preferred magnetic antenna 31 for use with the receiver 14 is the Raytheon Cube sensor, a triaxial air coil magnetic receiver that is currently one of the most sensitive instruments available with a noise floor at 10 kHz of 0.6 ftesla/sqrt Hz for the 12-inch antenna and 5 ftesla/sqrt Hz for the 6-inch antenna. The processing unit 15 operates a three component VLF receiver 35 and signal processor 43 to calculate the azimuth and inclination of vector magnetic fields induced by the transmitters 12. Using the known locations of the transmitters 12 and azimuths to distant transmitters 12, the processing unit 15 determines the receiver 14 location on a continuous basis as the receiver 14 is moved within the underground space.

Motion induced noise from movement of the receiver 14 can potentially decrease the accuracy of the system 10 and preferably should be reduced below the noise floor of the system 10 for typical user motions. The frequency of operation can mitigate unwanted noise, as the components of user noise induced at the operational frequency are small. Taking this into consideration, the receiver 14 is designed such that motion of components in the very low frequency range of interest (preferably below 10 kHz) are minimal. It should be understood that the method of taking into account such design consideration may be embodied in various ways according to the particular constraints of the receiver 14, which may be physical, electrical or aesthetic. For example and without limitation, the antennae 31, 33 can be encased in damping materials, e.g., foam, that substantially attenuate motion components in this range. This can be done with relatively small volumes of damping material. Furthermore, sufficient dynamic range on the antenna 31 outputs can be provided such that out of band motion induced noise (primarily in the extremely low frequency range) do not overload the electronics. Tilt sensors (part of other sensors 30) may be included on the antennae 31, 33 to measure antenna motion. Micro-electro mechanical sensor-based, solid state tilt sensors can be used for this purpose. With suitable motion information, adaptive filtering can be used to further reduce the effects of motion on the antenna 31, 33. Complete Faraday shielding of the antenna 31, 33 can be helpful to reduce potential interference from outside interferers.

Figure 11A:
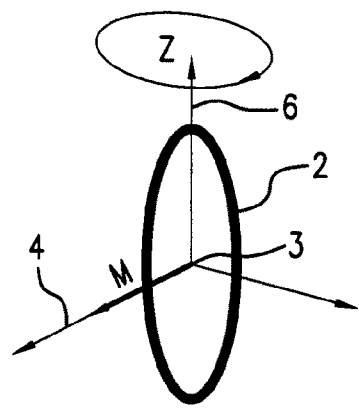
Figure 11B:
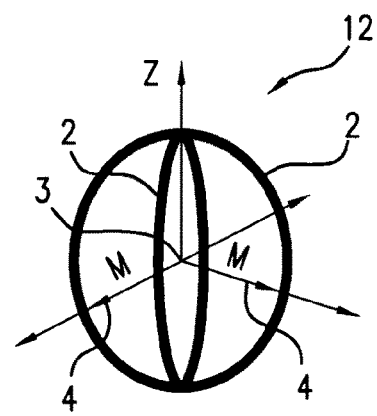
Figure 11C:
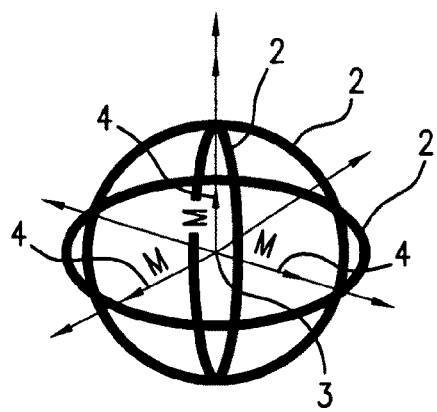

Navigation in underground environments is possible using an embodiment of the system 10 having transmitters 12 with two or more co-located magnetic dipoles with known magnetic properties (e.g., frequency, amplitude, and dipole orientation) or rotating dipoles (dipoles excited at a given frequency with the dipole direction rotating at a known speed around a known axis), as shown in FIGS. 11b and 11c. The rotating dipoles are preferred and comprise at least two dipole wires 2 with a modulated signal such that the dipole magnetic moment rotates around an axis of rotation 6 producing an associated amplitude signal that can be detected by receiver 14. This approach permits potential use of a smaller number of transmitters 12, which would also provide a more robust navigation solution. Previous navigation schemes required at least three operating beacons 12. This embodiment permits navigation from a single VLF navigation beacon 12 comprising two or more co-located transmitting magnetic dipoles.

If magnetic antenna 31 and VLF receiver 35 calibration is known and magnetometer and transmitter 12 are synchronized, exact position of the magnetometer can be obtained from a single beacon 12 in an empty space. If the rotating dipole rotates in all three dimensions of a beacon 12, then the bearing in global coordinate system can be obtained using a single transmitter 12.

Figure 5A:
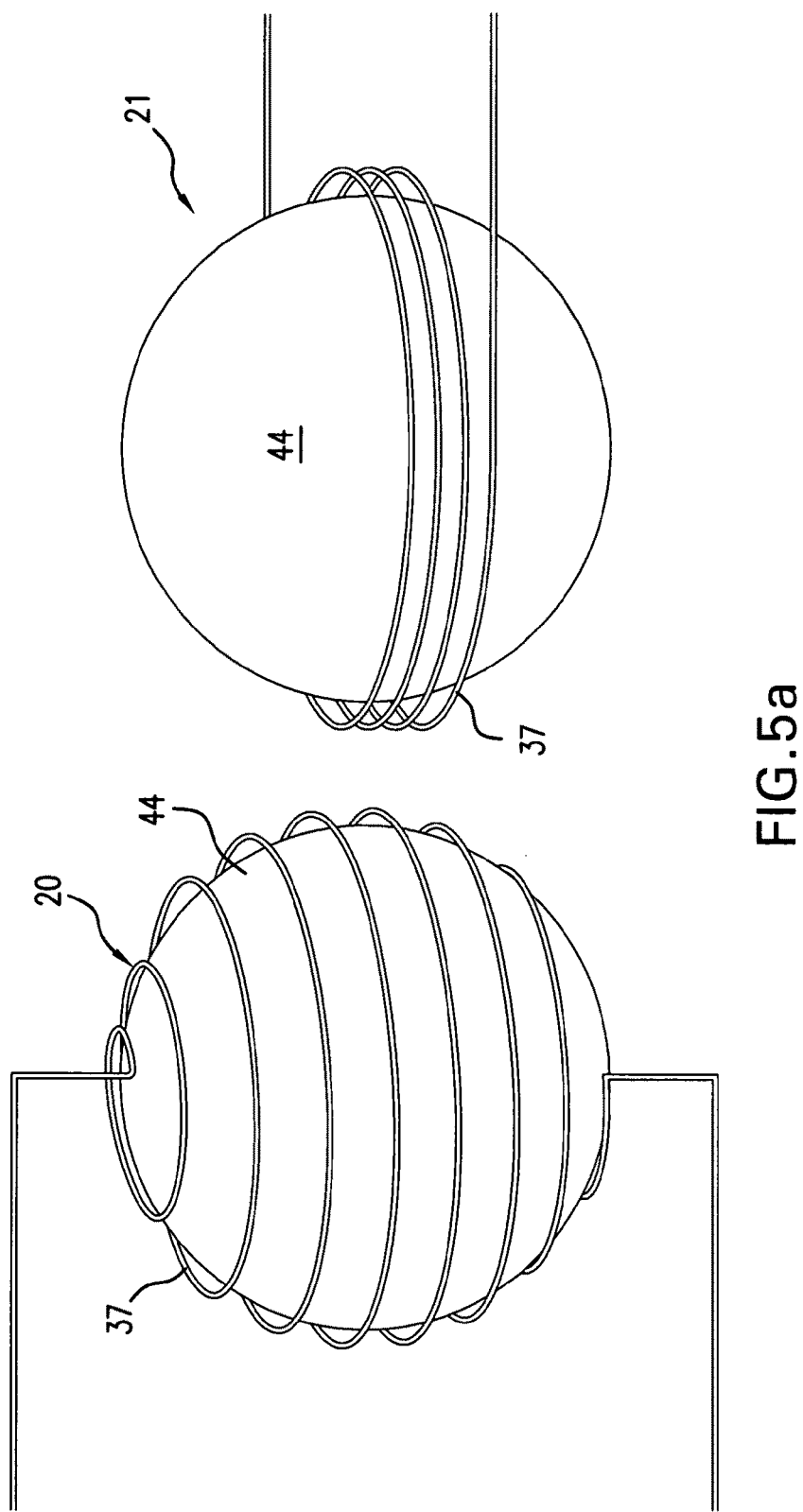
FIG. 5A shows a spherical core antenna and a horizontal loop antenna.
Figure 5B:
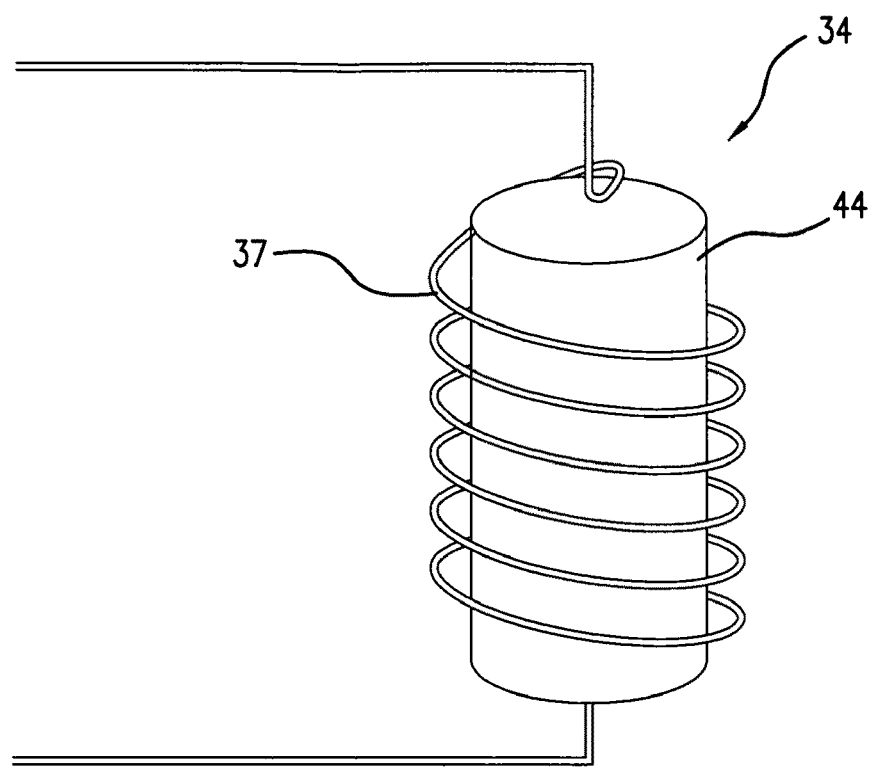
FIG. 5B shows a rod core antenna.
Figure 10:
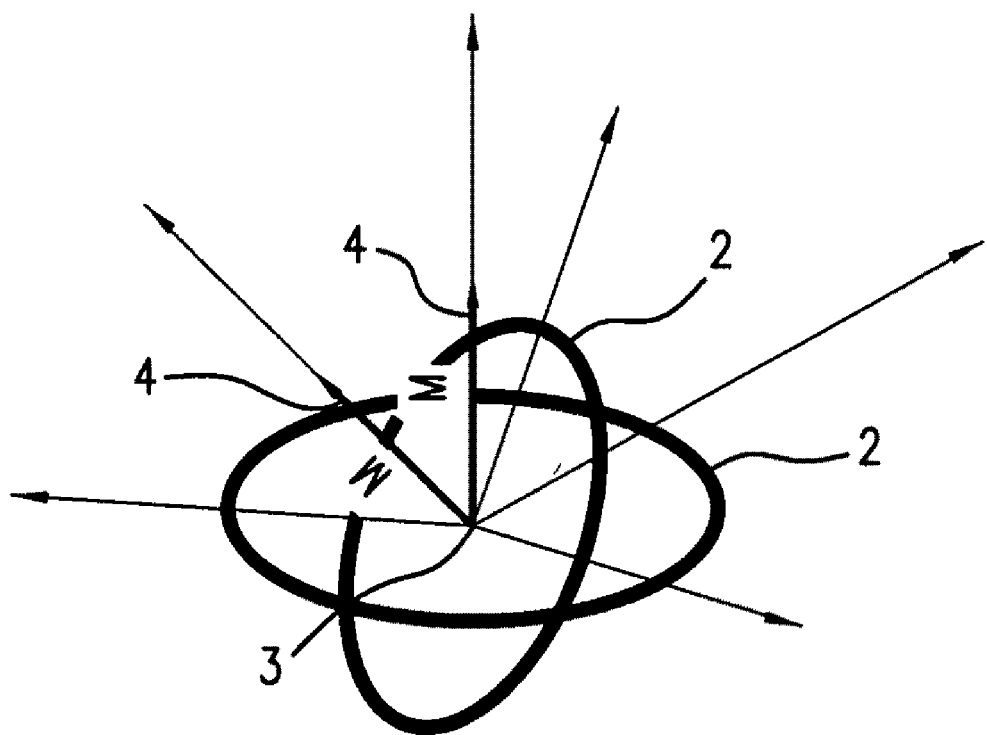
FIGS. 10-11c show variations of a magnetic dipole.

Navigation or location solutions for the rotating dipole embodiment can also extend to co-located dipole embodiments. As shown in FIG. 10, a co-located dipole beacon 12 is a beacon 12 that comprises two or more oscillating magnetic dipoles that are separately actuated. The dipoles are positioned in such a way that their centers 3 are in the same spot. The orientations of magnetic moments 4 for each dipole are different. A cube with three coils wrapped around its perpendicular faces is an example of a co-located dipole. A sphere with several coils is another. The transmitter 12 can be based on a ferromagnetic core 44 (sphere, cube, etc; FIGS. 5a and 5b) or it can be coreless.

FIG. 10 is an example of a coreless co-located dipole beacon 12 based on two coils 2. The figure shows two co-located dipoles. Two wire coils 2 carry currents from two separate power supplies. The coils 2 are stationary in space, but current in each coil 2 is modulated differently. For example, one coil 2 is actuated at frequency f1 while another at frequency f2 resulting in an associated amplitude signal that can be detected by receiver 14.

A spinning dipole beacon 12, as shown in FIGS. 11a to 11bc, is a magnetic dipole that is spinning around an axis 6 in space. An embodiment includes a transmitter 12 with the axis of rotation 6 perpendicular to the orientation of the resulting magnetic dipole rotating with constant angular velocity. FIG. 11a shows a magnetic beacon comprising of a magnetic dipole that is being rotated around an axis 6 perpendicular to its magnetic vector 4 (dipole magnetic moment). FIG. 11b shows a magnetic beacon 12 with the field equivalent to that in FIG. 11a; the two wire coils 2 are perpendicular to each other. The current source is modulated by a signal equal to the sine and cosine of the rotation phase. FIG. 11c shows a beacon 12 capable of 3D rotation of the effective magnetic dipole (three co-located dipoles).

A spinning dipole beacon does not need to have any moving parts. For example, a beacon described in FIG. 11b with two magnetic coils 2 perpendicular to each other will produce the same field if the current source actuating the two orthogonal coils 2 in FIG. 11b is producing currents defined by the following Equation 1:

$$\begin{cases} I_{Blue} = I_{Rotation}\sin(\varphi_{Rotation}) \\ I_{Green} = I_{Rotation}\cos(\varphi_{Rotation}). \end{cases} \quad \text{(Eq. 1)}$$

where $I_{Green}$ and $I_{Blue}$ are respective currents through the two coils 2 and $I_{Rotation}$ is the current through rotating coil, and $\varphi_{Rotation}$ is the angle of rotation of the rotating coil. Similar formulas can be derived for beacons comprising coils that are not orthogonal.

In a constant angular velocity case, the equation defining such currents can be shown by Equation 2, as follows:

$$\begin{cases} I_{Blue} = I_{Rotation}\sin(\omega t)\sin(\Omega t + \Phi) = \\ \quad \frac{I_{Rotation}}{2}(\cos((\omega + \Omega)t + \Phi) - \cos(\omega - \Omega)t - \Phi) \\ I_{Green} = I_{Rotation}\sin(\omega t)\cos(\Omega t + \Phi) = \\ \quad \frac{I_{Rotation}}{2}(\sin((\omega + \Omega)t + \Phi) + \sin(\omega - \Omega)t - \Phi) \end{cases} \quad \text{(Eq. 2)}$$

In other words, a rotating dipole is just a special case of a general co-located dipole. Full 3D rotation of the dipole is an equivalent of a 3 co-located dipoles (FIG. 11c). In an equivalent formulation, the magnetic moment of the beacon is described by the following Equation 3:

$$\overline{M} = \begin{bmatrix} M\cos(\Omega t + \Phi) \\ M\sin(\Omega t + \Phi) \\ 0 \end{bmatrix} \quad \text{(Eq. 3)}$$

where M=cos ωt is the dipole value, Ω and Φ are rotation frequency and phase, and ω is the beacon carrier frequency. For simplicity, the phase of the beacon carrier frequency signal is set to 0.

Co-located dipoles permit line of bearing (LOB) to be determined by a receiver 14 with an unknown orientation. To solve for LOB one determines 5 variables: 2 angles to the position of the receiver 14 in the magnetic dipole (beacon) coordinate system and 3 angles that determine orientation and position of the beacon in the receiver 14 coordinate system. Theoretically, the distance can be determined as well. The total geolocation requires measurement of a sixth variable: the distance between the beacon and the receiver 14.

The magnetic field measurements produce three measurements per magnetic dipole in a collocated transmitter 12 beacon. Thus, any collocated beacon permits LOB determination in the receiver 14 coordinates.

Where a magnetic beacon is located in the origin of a Global Coordinate system (GCS) and the co-located beacon is a spinning beacon with the dipole rotating around z axis 6 in GCS, the value of the magnetic vector in GCS is described by Equation 3, above. The magnetic field (B) of the dipole is determined by Equation 4, as follows:

$$\overline{B} = \frac{\mu_o}{4\pi}\left(\frac{3(\overline{M}\cdot\bar{r})\cdot\bar{r}}{r^5} - \frac{\overline{M}}{r^3}\right) \quad \text{(Eq. 4)}$$

Thus, the value of magnetic field at a point r in the GCC, where:

$$\bar{r} = \begin{bmatrix} X \\ Y \\ Z \end{bmatrix}$$

is expressed by Equation 5, as follows:

$$\vec{B}_{Global} = \frac{\mu_o M}{4\pi \cdot r^s}\left(\begin{bmatrix} 2x^2 - 3y^2 - 3z^2 \\ 3xy \\ 3yz \end{bmatrix}\cos(\Omega t + \Theta) + \begin{bmatrix} 3xy \\ 2y^2 - 3x^2 - 3z^2 \\ 3yz \end{bmatrix}\sin(\Omega t + \Theta)\right) \quad \text{(Eq. 5)}$$

Figure 12:
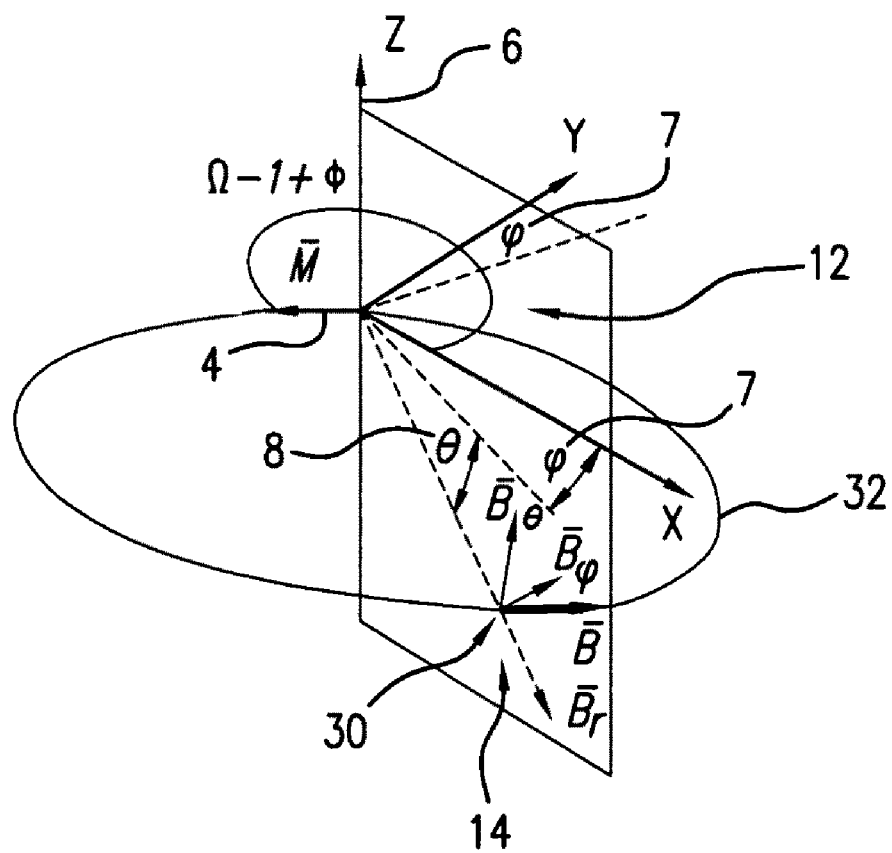
FIG. 12 shows a field line of a magnetic beacon in polar coordinates.

FIG. 12 shows a magnetic beacon in polar coordinates. The beacon is located in the origin of the X,Y,Z coordinate system. The receiver 14 unit is at the point of origin of vector B. The dipole magnetic moment 4 vector M denotes instantaneous orientation of the magnetic moment of the beacon at a particular point in time. The instantaneous magnetic field line 32 for the current position of the spinning beacon is shown. The magnetic field line 32 intersects the magnetometer position. Magnetic moment 4 is excited by a magnetic coil, e.g., 2, operating at a fixed frequency below 10 kHz while it is simultaneously rotating around Z axis 6 at several dozen rpm. In a polar coordinate system defined by the receiver 14 and the center 3 of the dipole, the values of magnetic moment 4 and the distance are defined by Equation 6, as follows:

$$\overline{M} = \begin{bmatrix} M\cos(\Omega t + \Phi - \varphi)\cos\vartheta \\ M\sin(\Omega t + \Phi - \varphi) \\ M\cos(\Omega t + \Phi - \varphi)\sin\vartheta \end{bmatrix} \quad \text{(Eq. 6)}$$

$$\bar{r} = \begin{bmatrix} r \\ 0 \\ 0 \end{bmatrix}$$

$$\overline{e}_i = \begin{bmatrix} \overline{e}_r \\ \overline{e}_o \\ \overline{e}_\vartheta \end{bmatrix}$$

Where $e_i$, refers to a unitary vector in corresponding direction. Thus, the component magnitudes of the magnetic field B are defined by Equation 7, as follows:

$$\begin{cases} B_r = \frac{\mu_o M}{4\pi r^3} \cdot 2 \cdot \cos(\Omega t + \Phi - \varphi) \cdot \cos\vartheta \\ B_\varphi = -\frac{\mu_o M}{4\pi r^3} \cdot \sin(\Omega t + \Phi - \varphi) \\ B_\vartheta = -\frac{\mu_o M}{4\pi r^3} \cdot \cos(\Omega t + \Phi - \varphi) \cdot \sin\vartheta \end{cases} \quad \text{(Eq. 7)}$$

The important feature of the Equation 7, above, is the fact that it separates the radial (r), azimuth ($\phi$), and incline ($\theta$) dependences of the magnetic field. The square of the magnetic field value can be determined from Equation 8, as follows:

$$|\vec{B}|^2 = \left(\frac{\mu_o M}{4\pi r^3}\right)^2 \cdot (1 + 3\cos^2(\Omega t + \Phi - \varphi) \cdot \cos^2\vartheta) = \quad \text{(Eq. 8)}$$

$$= \left(\frac{\mu_o M}{4\pi r^3}\right)^2 \cdot (1 + 1.5 \cdot \cos^2\vartheta + 1.5 \cdot \cos^2\vartheta \cdot \cos(2 \cdot (\Omega t + \Phi - \varphi))) =$$

$$= \left(\frac{\mu_o M}{4\pi r^3}\right)^2 \cdot \frac{3}{4} \cdot \left(\frac{4}{3} + \cos 2\vartheta + (1 + \cos 2\vartheta) \cdot \cos(2 \cdot (\Omega t + \Phi - \varphi))\right)$$

Note that the value of $|B|^2$ is independent of the actual orientation of the receiver 14. However, if the time dependence of $|B|^2$ is known, it provides enough equations to solve for distance (r), azimuth ($\phi$), and incline ($\theta$) in the GCS.

LOB Navigation in the receiver 14/Local Coordinate System (LCS) can be performed using this embodiment. The receiver 14 measures the instantaneous values of magnetic field $B_x$, $B_y$, $B_z$. To determine the LOB of the beacon 12 one has to find an orientation in the LCS in which the time dependence of the corresponding magnetic vector components would satisfy Equation 7. To find this orientation, one can remove carrier frequency by fitting the value of the magnetic filed into cos ωt and sin ωt and shifting the frequencies down by the value of ω. As follows for this embodiment, the described values of magnetic field are algebraic values of the modulation. The values of magnetic field $B_x$, $B_y$, $B_z$ are fit into cos Ωt and sin Ωt so that the following Equation 9 holds:

$$\vec{B}_x = a_x \cos(\Omega t + \Phi) + b_x \sin(\Omega t + \Phi)$$

$$\vec{B}_y = a_y \cos(\Omega t + \Phi) + b_y \sin(\Omega t + \Phi)$$

$$\vec{B}_z = a_z \cos(\Omega t + \Phi) + b_z \sin(\Omega t + \Phi) \quad \text{(Eq. 9)}$$

The defined vectors are:

$$V^o = \begin{bmatrix} a_x \\ a_y \\ a_z \end{bmatrix}$$

$$W^o = \begin{bmatrix} b_x \\ b_y \\ b_z \end{bmatrix}$$

Angles α and β are found so as to define the rotation of the magnetic field detector using Equation 10, as follows:

$$rot_i = \begin{bmatrix} \cos\alpha & -\sin\alpha & 0 \\ \sin\alpha & \cos\alpha & 0 \\ 0 & 0 & 1 \end{bmatrix} \cdot \begin{bmatrix} 1 & 0 & 0 \\ 0 & \cos\beta & -\sin\beta \\ 0 & \sin\beta & \cos\beta \end{bmatrix} \quad \text{(Eq. 10)}$$

such that the new axis y is parallel to the plane of magnetic dipole rotation by satisfying Equation 11, as follows:

$$\begin{cases} V^i = rot_i \cdot V^0 \\ W^i = rot_i \cdot W^0 \end{cases} \quad \text{(Eq. 11)}$$

$$\begin{cases} V_1^i \cdot W_2^i + V_2^i \cdot W_1^i = 0 \\ V_3^i \cdot W_2^i + V_2^i \cdot W_3^i = 0 \end{cases}$$

and angle $\gamma$ is determined by Equation 12, as follows:

$$rot_{ii} = \begin{bmatrix} \cos\gamma & 0 & \sin\gamma \\ 0 & 1 & 0 \\ -\sin\gamma & 0 & \cos\gamma \end{bmatrix} \quad \text{(Eq. 12)}$$

so that the new x axis points toward the transmitter 12 such that Equation 6, as follows, is satisfied:

$$\begin{cases} V^{ii} = rot_{ii} \cdot V \\ W^{ii} = rot_{ii} \cdot W^i \end{cases} \quad \text{(Eq. 13)}$$

$$V_1^{ii^2} + W_2^{ii^2} + 4 \cdot V_1^{ii^2} + 4 \cdot W_2^{ii^2} = 4 \cdot V_3^{ii^2} + 4 \cdot W_3^{ii^2}$$

The following Equation 14 is calculated:

$$\begin{bmatrix} x_1 & y_1 & z_1 \\ x_2 & y_2 & z_2 \\ x_3 & y_3 & z_3 \end{bmatrix} = rot_{ii} \cdot rot_i \quad \text{(Eq. 14)}$$

where vector:

$$\begin{bmatrix} x_1 \\ y_1 \\ z_1 \end{bmatrix}$$

points toward the transmitter in the local coordinate system. Once these two fits are performed, one can calculate direction to receiver 14 in the beacon coordinate system by noting that the vector:

$$\overline{D} = \begin{bmatrix} V_1^{ii} \\ W_1^{ii} \\ \text{sign}(V_3^{ii}) \cdot 2 \cdot \sqrt{(V_3^{ii})^2 + (W_3^{ii})^2} \end{bmatrix} \quad \text{(Eq. 15)}$$

in the Global Coordinate System points toward the receiver 14. Vector D is not unitary and can be normalized such that:

$$\overline{D}_0 = \frac{\overline{D}}{|\overline{D}|} \quad \text{(Eq. 16)}$$

Equation 13 holds true after $rot_{ii}$ is applied. Thus it should be determined if the fit described in Equation 9 and 10 should be performed after applying Equation 12 to measured fields of Equation 9 as in the following Equation 17:

$$rot_{ii} \cdot rot_i \cdot \begin{bmatrix} B_x \\ B_y \\ B_z \end{bmatrix} \quad \text{(Eq. 17)}$$

To determine the LOB of the receiver 14, one finds an orientation in the GCS in which the time dependence of the corresponding magnetic field vector components of the associated amplitude signal would satisfy Equation 7. To find this orientation, one may remove carrier frequency by fitting the value of the magnetic field into cos $\omega$t and sin $\omega$t and shifting the frequencies down by the value of $\omega$. The instantaneous values of the square magnetic field strength can be calculated using Equation 18, as follows:

$$|\vec{B}|^2 = |\vec{B}_x|^2 + |\vec{B}_y|^2 + |\vec{B}_z|^2 \quad \text{(Eq. 18)}$$

The value of the magnetic field strength is fit into cos $\Omega$t and sin $\Omega$t, such that Equation 19, as follows, is satisfied:

$$|\vec{B}|^2 = c_1 \cos(2\Omega + 2\Phi) + c_2 \sin(2\Omega + 2\Phi) + c_3 \quad \text{(Eq. 19)}$$

The values of azimuth ($\phi$) and incline $\theta$ in the GCS can be determined using Equation 20, as follows:

$$\begin{cases} \psi = \dfrac{\text{argument}(c_1, c_2)}{2} \\ \dfrac{1 + \cos\vartheta}{4/3 + \cos\vartheta} = \dfrac{\sqrt{c_1^3 + c_2^3}}{c_3} \end{cases} \quad \text{(Eq. 20)}$$

The value of $c_3$ in Equation 19, above, cannot be determined accurately in a noisy environment, even if the integration is performed over prolonged time. The value of the ratio of $c_1$ and $c_2$ is somewhat less susceptible to noise. In this environment, a dual spinning beacon, as shown in FIG. 13, can be introduced such that its magnetic moment 4 (or its associated signal) is defined by Equation 23, as follows:

$$\overline{M} = \begin{bmatrix} M_1 \cos(\Omega_1 t + \Theta_1) \\ M_1 \sin(\Omega_1 t + \Theta_1) \\ 0 \end{bmatrix} + \begin{bmatrix} 0 \\ M_2 \cos(\Omega_2 t + \Theta_2) \\ M_2 \sin(\Omega_2 t + \Theta_2) \end{bmatrix} \quad \text{(Eq. 23)}$$

The beacon shown in FIG. 12 is capable of producing a magnetic moment 4 as described for M by Equation 23 above. Using Equations 8 and 18-20, one can derive the values of the azimuth in coordinate systems independently defined by $M_1$ and $M_2$. The value of azimuth in the $M_2$ coordinate system of FIG. 13 is the incline in the $M_1$ coordinate system, and vice versa. FIG. 13 shows a spinning beacon and the related magnetic moments 4, which are independently spinning in the XY and YZ planes.

Figure 13:
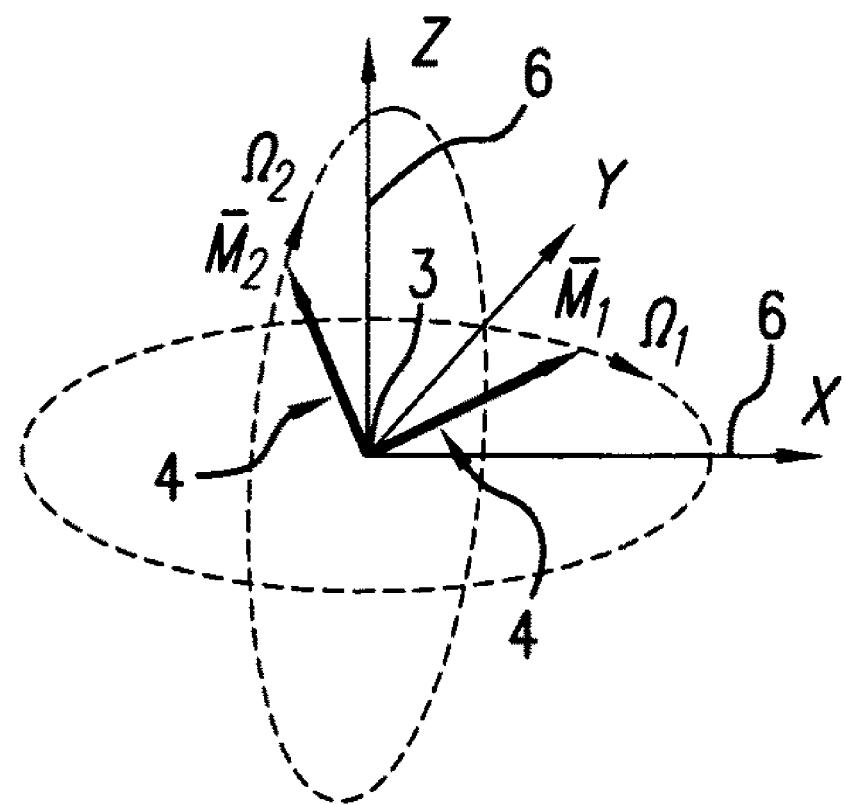
FIG. 13 shows a variation of a magnetic dipole.

To detect the magnetic moments 4 of FIG. 13 separately only one of the two frequencies (carrier and spinning) that characterize each magnetic moment need to be different. For example, they may have the same carrier frequency if rotation frequencies are different. Conversely, they may have the same spinning frequency if desired.

It is important to know if the receiver 14 is calibrated and beacon 12 amplitude is known, whether the beacon 12 phase $\Theta$ is known and whether the receiver 14 is synchronized, and based on such, what can be determined. If the receiver 14 is calibrated and beacon 12 amplitude known, and the beacon 12 phase is known and the receiver 14 synchronized, the exact position of the receiver 14 can be determined in GCS. If the receiver 14 is not calibrated or beacon 12 amplitude known, but the beacon 12 phase is known and the receiver 14 is synchronized, the bearing of the receiver 14 in GCS can be determined. If the receiver 14 is not calibrated or the beacon 12 amplitude is not known, and the beacon 12 phase is not known or the receiver 14 is not synchronized, the bearing of the receiver 14 in LCS can be determined.

Figure 14:
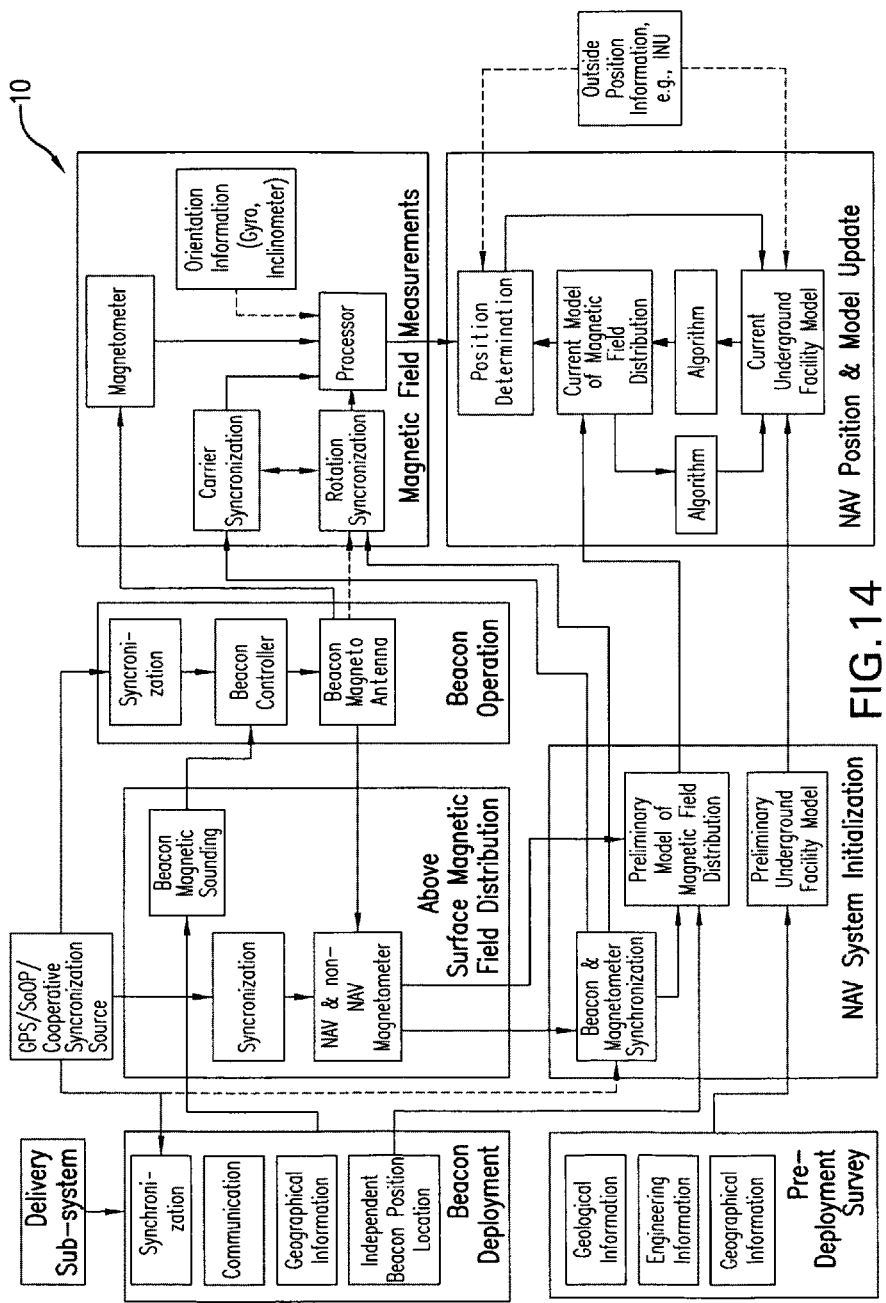
FIG. 14 shows a system in accordance with an embodiment.

Using a system 10 as shown in FIG. 14, it can be derived that a beacon 12 with three or more co-located dipoles gives bearings in GCS and a spinning beacon 12 is not required. In this embodiment, when a single spinning dipole per beacon 12 is used, the azimuth to the receiver 14 in the beacon 12 coordinates can be determined. Three beacons 12 with non-parallel beacon Z axes 6 are used to triangulate. When multiple (2 or more) spinning dipoles per transmitter 12 are used, full LOB to the receiver 14 can be determined. This uses two beacons 12 to triangulate, where one can be a single spinning dipole. With an actively tuned beacon 12, the beacon 12 spins around the orientation to the receiver 14 and a communication channel is used. There, the beacon 12 orientation tracks the receiver 14 for higher signal-to-noise ratio and full LOB to the receiver 14 can be determined. As such, two beacons 12 are used to triangulate and lower total energy is used than for a multiple spinning beacon 12 set up.

In another embodiment, the need to provide the receiver 14 with independent time-based synchronization with the transmitter 12 for line of bearing scalar magnetometer navigation using the co-located, rotating magnetic dipoles is eliminated. In this embodiment, two magnetic dipoles rotate around the same axis 6 and it is possible that only two magnetic coils 2 are used. Such an embodiment can be envisioned by adding a second coil 2 to the embodiment shown in FIG. 11a so that two dipoles are caused to rotate around the axis 6, but the phase of signals are at different beat frequencies. The phase of a signal at the different beat frequencies generated by the two spinning dipoles is independent of the position and orientation of the magnetometer and so can be used as a clock signal. Furthermore, in addition to using the twin magnetic dipoles for clock synchronization, they may also be used for navigation.

Figure 15:
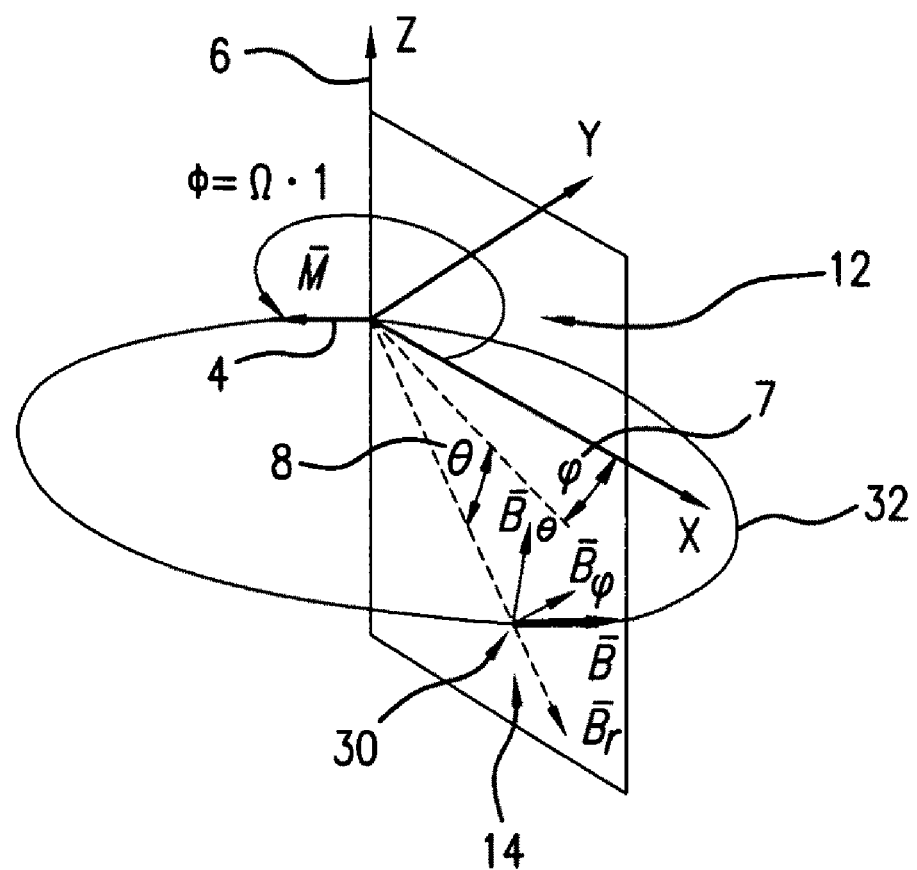
FIG. 15 shows the interaction between a transmitter and receiver.

To measure the angle between real parts of magnetic fields as described above, each transmitter 12 and receiver 14 should be provided with highly accurate and stable timing mechanisms (part of GPS receivers 17, 18 or other sensors 30), which are then mutually synchronized at the beginning of the period of interest. FIG. 15 shows how the receiver 14 can intercept magnetic field lines 32 of the signal resulting from the magnetic dipoles of a beacon 12 based on azimuth 7, incline 8, and magnetic field measurements.

In an environment where conductivity is high, synchronization to a beat frequency may be used to compensate for errors related to the time propagation (between the transmitters 12 and the receiver 14) effects. The magnetic field of two magnetic moments (M) with the same modulation frequency ω rotating around Z axis 6 with frequencies $\Omega_1$ and $\Omega_2$ is described by the following Equations 24 and 25:

(Magnetic moment equation)

$$\vec{M} = \begin{bmatrix} M_1\cos(\Omega_1 t + \Phi_1) + M_2\cos(\Omega_2 t + \Phi_2) \\ M_1\sin(\Omega_1 t + \Phi_1) + M_2\sin(\Omega_2 t + \Phi_2) \\ 0 \end{bmatrix} \cdot \cos\omega t \quad \text{(Eq. 24)}$$

(Magnetic field equation)

$$\vec{B} = \frac{\mu_0}{4\pi}\left(\frac{3\cdot(\vec{M}\cdot\vec{r})\cdot\vec{r}}{r^5} - \frac{\vec{M}}{r^3}\right) \quad \text{(Eq. 25)}$$

In latitude/longitude coordinates, the values of the field are determined by Equation 26, as follows:

$$\vec{B} = \frac{\mu_o \cos\omega t}{4\pi r^3}\begin{bmatrix} 2M_1\cos(\Omega_1 t + \Phi_1 - \varphi)\cdot\cos\vartheta + \\ 2M_2\cos(\Omega_2 t + \Phi_2 - \varphi)\cdot\cos\vartheta \\ -M_1\sin(\Omega_1 t + \Phi_1 - \varphi) - \\ M_2\sin(\Omega_2 t + \Phi_2 - \varphi) \\ M_1\cos(\Omega_1 t + \Phi_1 - \varphi)\cdot\sin\vartheta + \\ M_2\cos(\Omega_2 t + \Phi_2 - \varphi)\cdot\sin\vartheta \end{bmatrix}\begin{matrix}\rho\\ \\ \varphi\\ \\ \vartheta\end{matrix} \quad \text{(Eq. 26)}$$

Correspondingly, the value of the square of magnetic field B is determined by Equation 27, as follows:

(Eq. 27)

$$B^2 = \frac{\mu_o^2\cos^2\omega t}{16\pi r^6}\left(\frac{3}{2}M_1^2\cos^2\vartheta\cdot\cos(2(\Omega_1 t + \Phi_1 - \varphi)) + \right. \quad \text{Term 1}$$

$$\frac{3}{2}M_2^2\cos^2\vartheta\cdot\cos(2(\Omega_2 t + \Phi_2 - \varphi)) + \quad \text{Term 2}$$

$$M_1^2\left(\frac{3}{2}\cos^2\vartheta + 1\right) + M_2^2\left(\frac{3}{2}\cos^2\vartheta + 1\right) + \quad \text{Term 3}$$

$$3M_1M_2\cos^2\vartheta\cdot\cos(\Omega_1 t + \Phi_1 + \Omega_2 t + \Phi_2 - 2\varphi) + \quad \text{Term 4}$$

$$\left. M_1M_2(3\cos_1^2\vartheta + 2)\cdot\cos(\Omega_1 t - \Omega_2 t + \Phi_1 - \Phi_2)\right) \quad \text{Term 5}$$

Regarding terms 1, 2, and 4 above (Equation 27), each of them, or all of them together, may be used to determine the azimuth ϕ of the magnetometer. The first Term (or its equivalent second Term) is used to determine the azimuth in the case of transmitter 12 comprising a single spinning beacon 12. The fourth term is very similar to the first two Terms except for it being a beat frequency. The fifth, Term, the difference beat frequency, is independent of the azimuth.

The difference beat frequency term may be used for synchronization as a clock signal. Since the phase value of that Term is independent of the azimuth, its phase may be used as a clock to determine the starting time of navigation. In an environment where conductivity is high, synchronization to a beat frequency may be used to compensate for time propagation effects since the time delay of detecting the signal from the fifth Term is very similar to those for the Terms 1, 2 and 4.

The sum and difference beat frequency Terms may be used to determine the elevation. The ratio of the amplitudes of the last two terms depends on elevation only and are expressed by Equation 28, as follows:

$$\frac{\text{Term 4}}{\text{Term 5}} = \frac{3\cos^2\vartheta}{3\cos 2\vartheta + 2} \quad \text{(Eq. 28)}$$

The ratio is independent of both azimuth and distance. Both of these terms can be measured in a noisy environment. Normally, amplitude ratio is expected to be noisier that the phase measurement. Unlike the single spinning beacon case, however, none of these terms are measured at a fixed frequency (2ω), but are equivalents of measuring the difference of signals at two different frequencies around 2ω.

Figure 3:
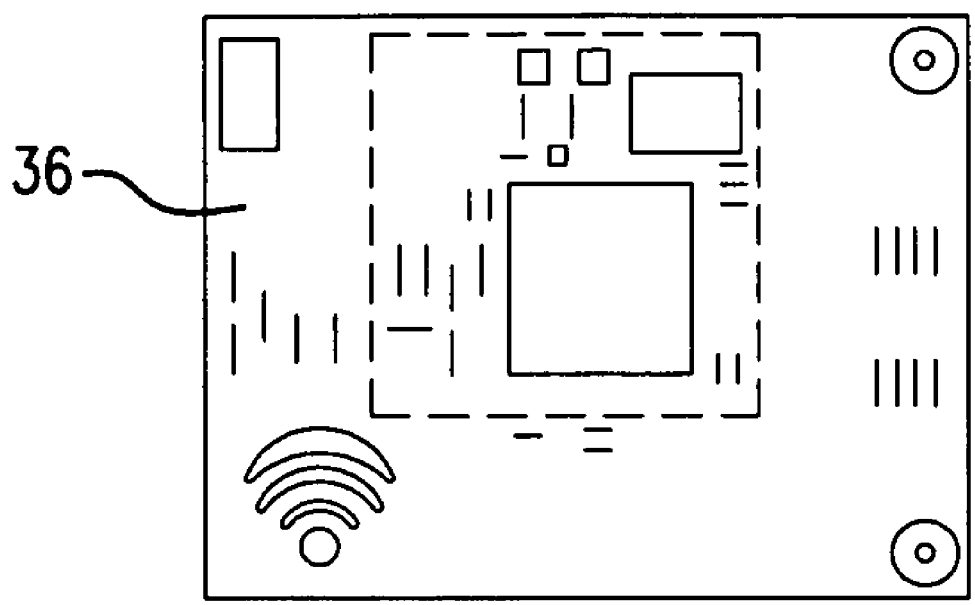
FIG. 3 shows a transceiver according to an embodiment.

In another embodiment, the receiver 14 can also incorporate an integrated back channel communications path that enables the user to have elementary communications throughout and outside of the underground location linked to traditional communications systems located near the point of entry. As shown in FIG. 3, one embodiment uses miniature, disposable, easily concealed ad hoc, mesh networked transceivers 36 for this purpose.

The networking protocol can be configured to allow automatic network join, relay and update using the receiver 14 and transceivers 36. A baseline 2.4 GHz radio transceiver 36 measures less than 21×27×6 mm including an antenna, or about the area of a postage stamp. In operation, a user can drop or place these transceivers 36 as a "bread crumb" trail as he or she moves along a tunnel or facility. When placed at corners or choke points, the transceivers 36 are able to communicate several hundred meters before another one must be placed.

The VHF transceiver 45 (FIG. 2) of the receiver 14 can have a transceiver 36 embedded in its electronics that communicates with the "bread crumb" trail. At the entrance to an underground area, a conventional communications transceiver (not shown) can connect to a communications channel for the rest of the network supporting the operation. The transceivers 36 can send and receive data. The receiver 14 can be configured with methods for an operator to easily and rapidly enter encoded commands that can be relayed to and from the communications network. A small, hand held or wearable personal digital assistant or similar user output device 24 or 16 can be used for this purpose. It is also possible to send and receive either intermittent or continuous voice communications over this same network. Users are furthermore able to send their position to the rest of the operations team. Similarly, users are able to receive, via the same network, the locations of other users in a team as they report their positions with other receivers 14.

Referring back to FIG. 1, the transmitters can be surface magnetic beacons 12 that provide a signal on different frequencies in the very low/low frequency range. Three to four of these transmitters 12 are usually preferred to support the receiver 14 of the positioning system 10, such as in its use in underground space.

Figure 4:
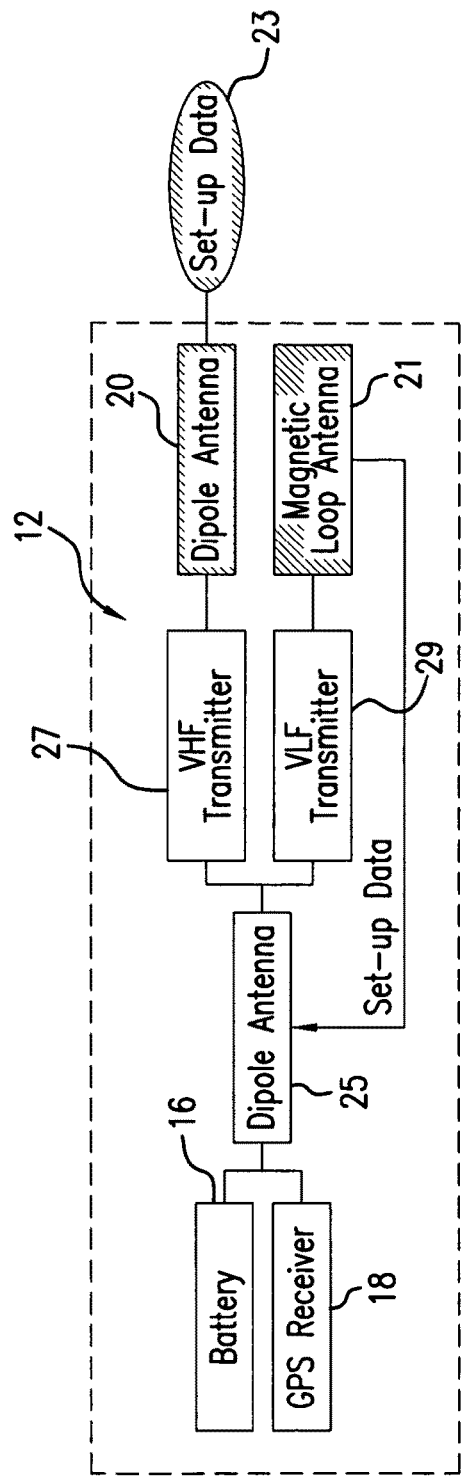
FIG. 4 shows a block diagram of a magnetic beacon transmitter.

FIG. 4 shows a block diagram of a transmitter 12. Each transmitter 12 comprises a power supply 16, typically a battery pack capable of sustaining the system for up to 30 or more hours, extendable with additional batteries, a processor 25, a Very High Frequency ("VHF") transmitter 27, a Very Low Frequency ("VLF") transmitter 29, a dipole antenna 20, and a magnetic loop antenna 21. The transmitter 12 provides an adjustable frequency source detectable by the receiver 14. The GPS receiver 18 may be used by the processor 25 to determine the location of the transmitter 12 to within one meter. The coordinates are transmitted to the receiver 14 as setup data 23 prior to the receiver 14 entering the space of interest, whether above or below ground. The transmitting antenna 21 may be a simple coil of wire or a more complex system employing a ferrite core. The transmitters 12 may be packaged for hand emplacement, for airdrop, or for being mounted on vehicles.

Referring again to FIG. 1, when the receiver 14 is operated in an underground space of interest 50, varying amounts of ground, rock, and soil elements of the surface 5 can be disposed between the transmitters 12 and the receiver 14. In order to determine the transmitter 12 output strength required for detection by the receiver 14 under such circumstances, an operator may assume a 1 Am² source and computed the fields at the received location as a function of frequency (2πω), depth (R) and soil conductivity (σ). For a vertical magnetic dipole at the Earth's surface 5, the fields are described for the quasi-static case where the distance from the transmitter 12 to the source is much less than a wavelength in the conducting medium (e.g., Earth surface 5). In such a medium, the propagation constant is determined using Equation 29:

$$\gamma^2 = -\omega^2 \mu \epsilon + j\omega\mu\sigma \qquad \text{(Eq. 29)}$$

where $\mu$ and $\epsilon$ are the permeability and permittivity of the conducting medium and $\gamma$ is the propagation constant. By definition, the wavelength ($\lambda$) in the conducting media is shown by Equation 30, as follows:

$$1/|\gamma| = \lambda \qquad \text{(Eq. 30)}$$

For conditions of:
$10^{-1} < \sigma < 10^{-4}$ mhos
$100 < R < 1000$ meters
$100 < f < 10^6$ hertz the principal component of the magnetic field at the walls of a tunnel at the receiver 14 location is the vertical magnetic field, determined by Equation 31 as follows:

$$H_z = \frac{3me^{\gamma z}}{\pi \gamma h^4} \qquad \text{(Eq. 31)}$$

where m is the magnetic dipole moment in Amp-m². Making some basic assumptions for typical operating conditions:
$\sigma = 10^{-3}$ mhos
f=10,000 Hz
R=100 and 300 meters produces the following values for field strength at the receiver 14:
R=100 m, $H_z = 1.5 \times 10^5$ fTesla
R=300 m, $H_z = 1.9 \times 10^1$ fTesla Again, the above values assume a 1 A-m² transmitter dipole moment.

The sensitivity of the 6-inch ELF cube baseline antenna for use in the receiver 14 is 6 ftesla at 10 kHz. Assuming this sensitivity is tangential (SNR=6 dB), this embodiment can operate at 20 dB SNR, and band limit noise to 1 Hz to give satisfactory dynamic system response. Computing the desired transmitter 12 strength shows that the dipole moments used are $1.6 \times 10^{-3}$ Am² at 100 m depth and 0.8 Am² at 300 m depth. These are relatively easily generated signal strengths in the 5 to 10 kHz range. For example, the battery operated Zonge NT-20 TEM transmitter driving a 1 m² loop can readily generate a 25 Am² dipole moment. Much larger moments can be generated by this transmitter using a larger antenna.

Very low frequency (VLF) magnetic beacons are used to implement the sub-surface navigation systems disclosed herein. These magnetic beacons are compact, energy efficient, and powerful, generating a high magnetic moment with minimum energy. FIG. 5a illustrates an exemplary dipole antenna 20 and horizontal loop antenna 21 of the transmitter 12 shown in FIG. 4. The antenna 21 can have the following characteristics: an air core 44, 100 turns of 37 aluminum wire, two layers thick, 0.1 m radius and 0.26 m high. An antenna 21 of this configuration would weigh about 3.7 kg and have input impedance at 10 kHz of 1+j48Ω. To create a 1 A-m² dipole moment, it could be driven at 0.3 amps at 15 volts or 5 Watts input power. A power efficient amplifier, Class D, can be used to produce the drive signal with acceptable levels of harmonic distortion and at efficiencies of 90%. Thus, for about 6 Watts of battery power, the transmitter can provide a constant CW transmitter signal.

For a design using 10 D cell LiSO₂ primary battery delivering 175 Watt-hours at 15 volts, the transmitter 12 can operate in excess of 30 hours. The antenna 21 parameters are not limited to the above configuration, but may be configured to utilize optimization to minimize power consumption and produce the largest transmitted dipole moment as required. The design of the amplifier electronics is straightforward and will not be discussed further here.

Figure 16:
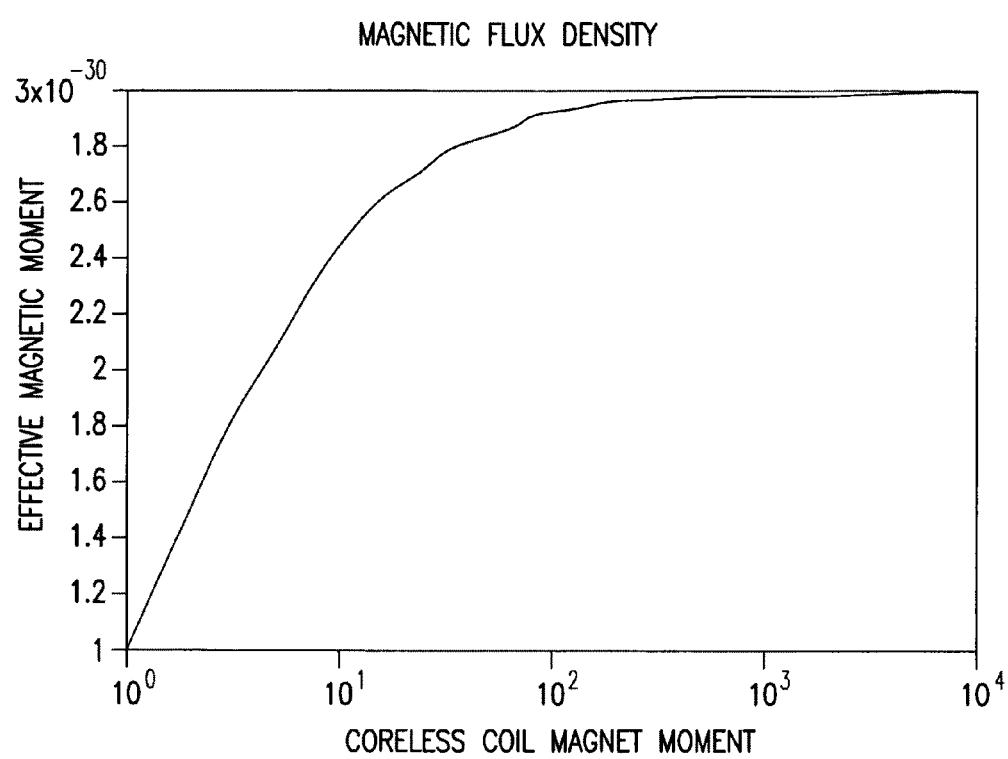
FIG. 16 is a chart showing the relationship between effective magnetic moment and a coreless coil magnetic moment.

In order to increase magnetic moment, in another embodiment, antenna 20 can be constructed using a magnetic core 44 instead of an air core 44. The magnetic core 44 can boost the effective magnetic moment with the advantage over an air based core 44 in that, unlike the number of turns of wire 37, the magnetic core 44 boosts both magnetic moment (M) and inductance (L) by the same ratio, as shown in FIG. 16. The magnetic permeability can be in the 10-50 range. This can be achieved by using a small diameter ferrite core 44 or a large diameter foam core 44 with ferrite particles suspended within. Based on modeling of a single turn magnetic coil with a 1.001 meter diameter and a magnetic moment of 1 Am², the effective magnetic moment of a coil 37 with a spherical core 44 is expressed by Equation 32 as follows:

$$M_{Effective} = \frac{3\mu}{\mu+2} M \quad \text{(Eq. 32)}$$

where M is the magnetic moment without the core 44 and $\mu$ is the permeability of magnetic material. The calculated model follows the graph of FIG. 16.

The magnetic core 44 may be spherical as shown in FIG. 5a or a cylindrical rod core 44 as the antenna 34 shown in FIG. 5b. A magnetic core antenna 34 including a magnetic core 44, particularly a cylindrical rod core 44 can be used to provide two-way communication between the surface and underground in system 10. With such an antenna 34 included in the receiver 14 as well as on the surface, the magnetic moment can be amplified to such an extent that continuous communications are possible. This allows a user of the receiver 14 to have surface-to-subsurface, bidirectional, continuous communications over the system 10.

Figure 6:
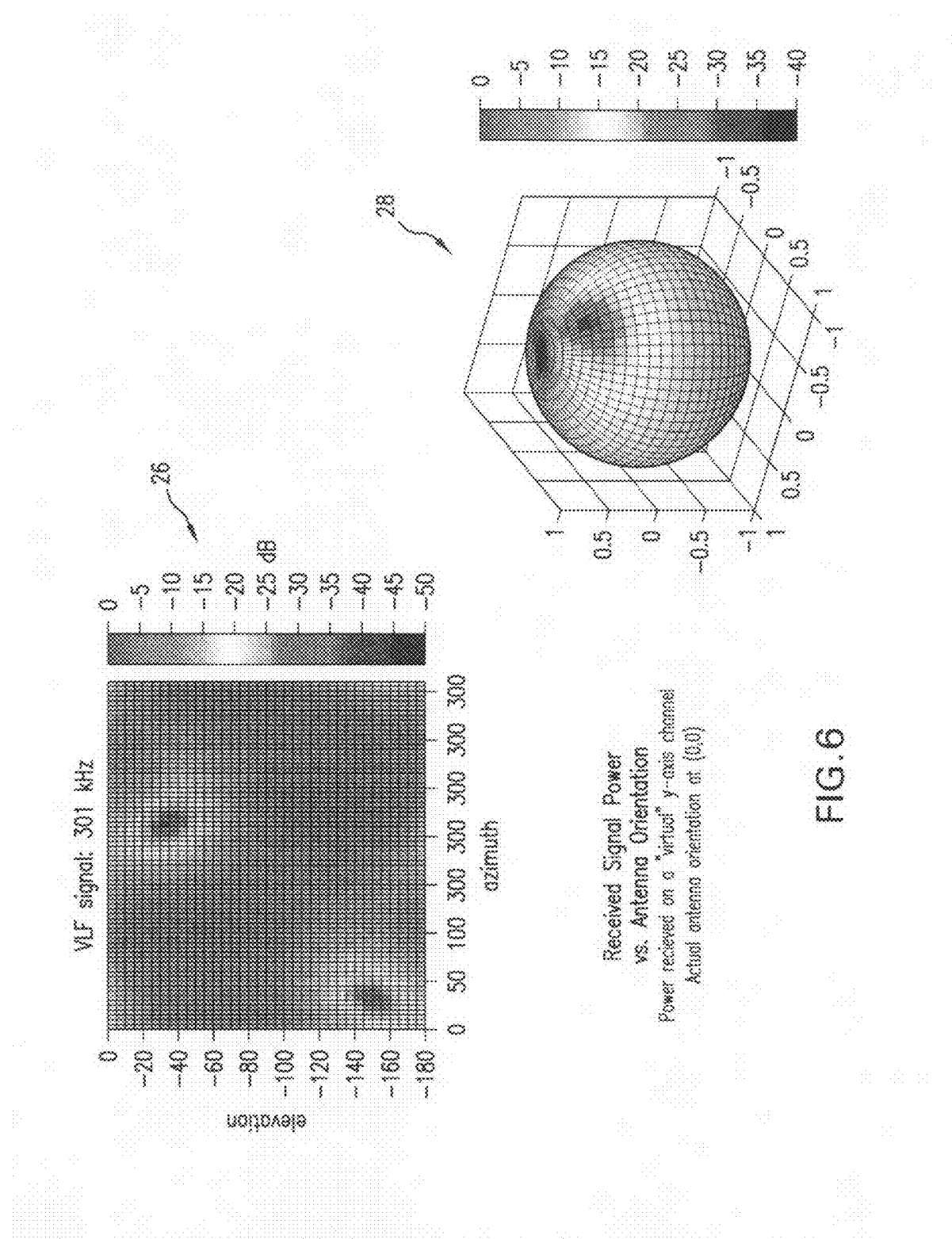
FIG. 6 illustrates an analysis of a positioning system according to an embodiment.

FIG. 6 shows an elliptically polarized signal 28 and a diagram 26 of received signal power versus antenna orientation. The diagram 26 of the energy distribution shows an elliptically polarized signal sent by a transmitter 12 and received by a Raytheon Cube used as a receiver 14. Once signals from beacons 12 are received by the receiver 14, they can be processed to determine the vector azimuth of the primary magnetic field from each transmitter 12 as received. Each channel corresponding to the transmitting frequencies of antennas 21 on the surface can be processed in this manner to determine the solid angles between the vector fields of each transmitter 12. In addition to the signals from the surface transmitters 12, other signals of opportunity 13 (FIG. 1) such as navigation beacons, very low frequency communications systems, and High frequency Active Auroral Research Program (HAARP) can be used to provide additional information on the location.

The location accuracy of the system 10 is affected by the ability of the receiver 14 to accurately understand and compensate for propagation anomalies in the medium between the surface transmitters 12 and the receiver 14 when the receiver 14 is underground. Signals of opportunity 13 can sometimes be used to characterize the medium (e.g., below surface 5). Distant sources of signals of opportunity 13 can produce essentially uniform fields at the surface of the region around the operational area. These uniform fields can provide a source of signals that can be measured at the receiver 14. By accurately measuring these signals 13, the effects of inhomogeneities in the medium can be estimated. These effects can then be used to adjust measured direction of arrival of signals from the surface transmitters 12 to more accurately predict receiver 14 location.

In practice, the received signals may not always be as "clean" as is shown in the example in FIG. 6 because there can be multi-path energy as well as secondary induced magnetic sources. However, this apparent clutter can be discriminated from the primary field due to its signal characteristics and quadrature phase shift. In order to further discern receiver 14 the location, additional sensors 30 (FIG. 2) as previously mentioned can be employed with the receiver 14 to provide independent information to either directly identify the location or to assist in weighting the contribution of beacon 12 signals. Additional sensors 30 can include a magnetic compass, accelerometers/tiltmeters, a microbarograph, ranging between back channel communications relay cards, and a pedometer for a man-pack version and an odometer for a vehicle mounted unit.

If, during a period of time in underground operation, no signal is detected at all, the inertial guidance system 19 (FIG. 2) may provide updated location information several times per second. In this manner the receiver 14 may continue operation during times when transmitters 12 are temporarily out of range or significant receiver 14 anomalies occur that distort magnetic fields to negatively impact the calculated location. Another embodiment permits the use of magnetic fields for localization without requiring use of an inertial navigation unit to orient the magnetic field sensor of the receiver 14. If multiple magnetic field sources from the transmitter 12 of known location and frequency are available, the magnetic field parameters can be measured independently of receiver 14 orientation using the angles between the real parts of the magnetic files created by each transmitter 12. This embodiment is well suited for use with the ferrite core 44 magnetic antennas 20, 21, 34 shown in FIGS. 5a and 5b.

While the inertial guidance system 19 is useful for situations in which the receiver 14 is out of range of the transmitters 12, it is less reliable if over-relied upon, occasionally providing erroneous coordinates due to drifting. It also requires the receiver 14 be properly oriented, which may be inconvenient at times. The receiver 14 magnetometer can be used as an additional location check during periods of use when the receiver detects the magnetic field of at least two transmitters 12. The receiver 14 measures a magnetic field in its own body coordinate system. Assuming a global coordinate system and the body coordinate system are aligned, the receiver 14 can measure three component values (x,y,z) of the magnetic field H according to Equation 33, as follows:

$$\overline{H}(t) = \begin{bmatrix} H_X(t) \\ H_Y(t) \\ H_Z(t) \end{bmatrix} \quad \text{(Eq. 33)}$$

or for a pure sine signal, according to Equation 34, as follows:

$$\overline{H}(t) = \begin{bmatrix} H_X^R \cos(\omega t) + H_X^I \sin(\omega t) \\ H_Y^R \cos(\omega t) + H_Y^I \sin(\omega t) \\ H_Z^R \cos(\omega t) + H_Z^I \sin(\omega t) \end{bmatrix} = \text{Re}\left( \begin{bmatrix} \dot{H}_X e^{j\omega t} \\ \dot{H}_Y e^{j\omega t} \\ \dot{H}_Z e^{j\omega t} \end{bmatrix} \right) \quad \text{(Eq. 34)}$$

The global and body coordinate system, however, are not necessarily aligned. The relationship between these coordinate systems is described by a 3×3 time-dependent rotation matrix Rot(t) so that the receiver 14 actually measures H according to Equation 35, as follows:

$$\vec{H}_{Meas}(t) = \text{Rot}(t) \cdot \vec{H}(t) \quad \text{(Eq. 35)}$$

where Rot(t) satisfies Equation 36, as follows:

$$\text{Rot}^T(t) = \text{Rot}^1(t) \quad \text{(Eq. 36)}$$

It is important to realize that the square of the magnetic vector is independent of the orientation of the receiver 14, as shown by Equation 37, below:

$$\vec{H}_{Meas}^T(t) \cdot \vec{H}_{Meas}(t) = (\vec{H}^T(t) \cdot \text{Rot}^T(t)) \cdot (\text{Rot}(t) \cdot \vec{H}(t)) = \vec{H}^T(t) \cdot \vec{H}(t) \quad \text{(Eq. 37)}$$

Variables may be extracted from measurements of the square of the amplitude of magnetic field (Eq. 37). Assuming that magnetic beacons of two transmitters 12 are generating fields H1 and H2 at the location of the receiver 14 that can be described as:

$$\vec{H}_1 = \vec{H}_1^R \cdot \cos(\omega_1 t) + \vec{H}_1^I \cdot \sin(\omega_1 t) = Re(\dot{H}_1 e^{j\omega_1 t})$$

$$\vec{H}_2 = \vec{H}_2^R \cdot \cos(\omega_2 t) + \vec{H}_2^I \cdot \sin(\omega_2 t) = Re(\dot{H}_2 e^{j\omega_2 t}) \quad \text{(Eq. 38)}$$

The output of a receiver 14 exposed to magnetic field (Eq. 34) will still be described by equations (36) and (37):

$$\vec{H}^T(t) \cdot \vec{H}(t) = (\vec{H}_1^R \cdot \cos(\omega_1 t) + \vec{H}_1^I \cdot \sin(\omega_1 t) + \vec{H}_2^R \cdot \cos(\omega_2 t) + \vec{H}_2^I \cdot \sin(\omega_2 t))^T \cdot (\vec{H}_1^R \cdot \cos(\omega_1 t) + \vec{H}_1^I \cdot \sin(\omega_1 t) + \vec{H}_2^R \cdot \cos(\omega_2 t) + \vec{H}_2^I \cdot \sin(\omega_2 t)) + \text{Noise} \quad \text{(Eq. 39)}$$

Combining the frequency terms of Equation 39, using Equation 40 below, one derives:

$$\vec{H}^T(t) \cdot \vec{H}(t) = \frac{|\vec{H}_1^R|^2 - |\vec{H}_1^I|^2}{2} \cdot \cos(2\omega_1 t) + $$
$$\vec{H}_1^R \cdot \vec{H}_1^I \cdot \sin(2\omega_1 t) + $$
$$\frac{|\vec{H}_2^R|^2 - |\vec{H}_2^I|^2}{2} \cdot \cos(2\omega_2 t) + $$
$$\vec{H}_2^R \cdot \vec{H}_2^I \cdot \sin(2\omega_2 t) + $$
$$\frac{\vec{H}_1^R \cdot \vec{H}_2^R + \vec{H}_1^I \cdot \vec{H}_2^I}{2} \cdot \cos((\omega_1 + \omega_2)t) + $$
$$\vec{H}_1^R \cdot \vec{H}_2^R \cdot \sin((\omega_1 + \omega_2)t) + $$
$$\frac{\vec{H}_1^R \cdot \vec{H}_2^R - \vec{H}_1^I \cdot \vec{H}_2^I}{2} \cdot \cos((\omega_1 + \omega_2)t) + $$
$$\frac{|\vec{H}_1^R|^2 + |\vec{H}_2^R|^2 - |\vec{H}_1^I|^2 - |\vec{H}_2^I|^2}{2} + $$
$$\text{Noise} \quad \text{(Eq. 40)}$$

Coherent detection at double beacon frequencies and the beat frequencies will recover values of each of the terms in Equation 40. For example, using Equation 41 below, one can recover the fifth and seventh terms of Equation 40:

$$\frac{2}{T} \int_0^T dt \cdot \vec{H}^T(t) \cdot \vec{H}(t) \cdot \cos((\omega_1 + \omega_2)t) = \frac{\vec{H}_1^R \cdot \vec{H}_2^R + \vec{H}_1^I \cdot \vec{H}_2^I}{2} \quad \text{(Eq. 41)}$$

$$\frac{2}{T} \int_0^T dt \cdot \vec{H}^T(t) \cdot \vec{H}(t) \cdot \cos((\omega_1 - \omega_2)t) = \frac{\vec{H}_1^R \cdot \vec{H}_2^R - \vec{H}_1^I \cdot \vec{H}_2^I}{2}$$

Equation 40 does not permit complete recovery of the vectors. Each of the vectors has 3 components for both real and imaginary parts. Thus, there are 12 unknown variables in Equation 40 and only 8 sub-equations. However, Equation 40 does permit recovery of a very important value, namely, the cosine of the angle between vectors of real parts of magnetic field generated by the two transmitters 12 (1 and 2):

$$\cos(\alpha_{1,2}) = \frac{\vec{H}_1^R \cdot \vec{H}_2^R}{|\vec{H}_1^R| \cdot |\vec{H}_2^R|} \quad \text{(Eq. 42)}$$

One can determine the numerator of Equation 42 from Equation 40.

In an isotropic media, the denominator of Equation 42 can be recovered as well. There are eight sub-equations and eight unknowns in Equation 40, namely:

$$|\vec{H}_1^R|, |\vec{H}_2^R|, |\vec{H}_1^I|, |\vec{H}_2^I|, |\vec{H}_1^R \cdot \vec{H}_2^R|, |\vec{H}_1^I \cdot \vec{H}_2^I|, |\vec{H}_1^R \cdot \vec{H}_2^I|, |\vec{H}_2^R \cdot \vec{H}_1^I|$$

In non-isotropic media, Equation 42 can be solved only approximately, but at low enough frequencies with sufficient accuracies.

Figure 7:
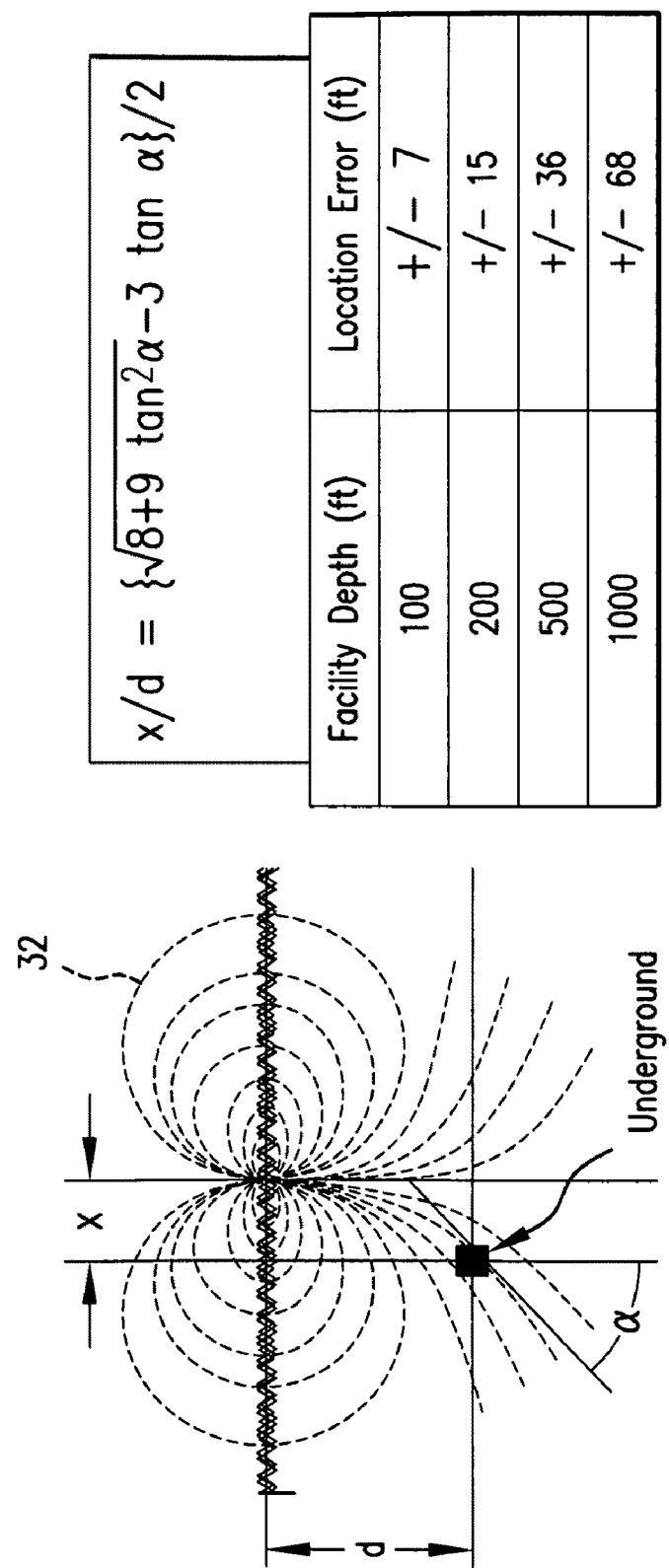
FIG. 7 shows an error analysis for the positioning system according to an embodiment.

FIG. 7 provides an error analysis for the positioning system 10. This analysis assumes that there is a +/−5° error in the measurement of the vector direction. Through integrating and signal processing, this can be reduced to +/−1°. However, geological effects and the presence of anomalous secondary radiators increase that uncertainty to approximately +/−5°. Through the use of precision frequency control and external synchronization of the transmitters 12 and receiver 14 through the initial set-up data 23 and back channel or surface-to-subsurface communications, it is possible to reduce this final uncertainty by an additional factor.

The positioning system 10 can use potential distance, but cooperative sources assist in reducing the depth uncertainty. Higher power transmitters 12 can be used to excite a swept frequency chirp or other multi-frequency signal. Due to the frequency dependence of depth of penetration of electromagnetic waves in the ground, the receiver 14 antenna 31 in the underground is able to detect the increased attenuation of higher frequencies within the chirped signal and thereby provide an additional constraint of the depth of the receiver 14.

The positioning system 10 can have a short set up time, can be easily operated by field personnel, and affords the ability to deploy worldwide. The system 10 consists of rugged magnetic transmitters 12 (beacons) operating in the very low/low frequency range. The system 10 can be deliverable by air or manual means and is unaffected by most nearby structures.

Figure 8:
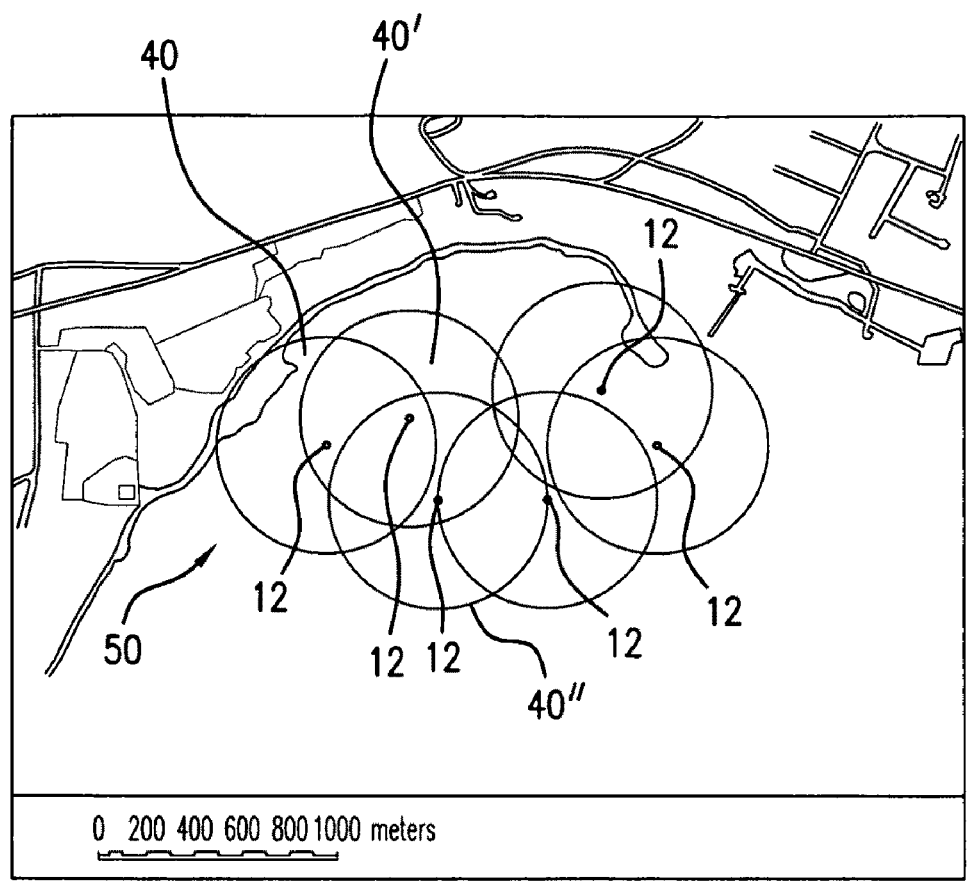
FIG. 8 shows transmitter coverage upon deployment in accordance with an embodiment.

Deployment of transmitters 12 can be conducted in several ways. The transmitters 12 may be air dropped by fixed-wing aircraft, rotary aircraft or emplaced manually. An all terrain vehicle may be used to place the transmitters 12 in the desired location providing the optimum overlay pattern. The transmitters 12 should be placed in such a manner that at least three of the signals 40, 40', 40" overlap each other in the effective beacon range, as shown in FIG. 8. To ensure adequate coverage of the transmitter 12 beacon range, signal emissions 40, 40', 40" can form an umbrella over the target area 50.

To initiate use of the positioning system 10, field personnel can synchronize their receivers 14 with transmitters 12 verifying connectivity by signal display on their receivers 14. Once each transmitter 12 is placed and activated, they can turn on and auto locate by using a Global Positioning System (GPS). Upon GPS lock, the transmitter 12 can begin emitting location and orientation signals to the receiver 14 (FIG. 1). Transmitter 12 locations and orientation are sent to the receiver 14 prior to entering an underground facility. The operator can ensure that the receiver 14 initializes with the transmitters 12 prior to going underground and that track logging is operational. An operations center located off site, but in proximity to the application site, may be established to monitor the current position of the positioning system receivers 14 underground.

The positioning system 10 receiver 14 can be mounted on an all-terrain vehicle or worn in a backpack. The receiver 14 can be configured in a man pack mode or an ATV configuration. All necessary accessories are compatible with either configuration. The receiver 14 can display current grid location, bearing, path tracking, critical waypoints of interest, and battery life. The receiver 14 can be an operator controllable, backlit, drill down menu based platform. The menus can be designed to be easily navigated and user friendly.

The transmitters 12 and receivers 14 can have an active life cycle of up to 30 or more continuous operating hours, extendable with additional batteries. In the event field operations exceed the life cycle, the batteries can be manually replaced or new transmitters 12 can be deployed. An internal memory battery 42 (FIG. 2) can prevent data receiver 14 loss in the event of the primary battery failure. To conserve beacon 12 battery 16 power and limit operating signature, programmable time delay and wake up capability can be used when transmitters are emplaced prior to operations.

A back channel communication link using disposable transceivers 36 (FIG. 3) or surface-to-subsurface, bidirectional communications using magnetic dipoles 34 (FIG. 5*b*) can be used to communicate with the surface transmitter/receiver and other operational elements. These transceivers 36 can provide line of sight data relay along the tunnels whereas magnetic dipoles 34 need not rely on such. The individual transceivers 36 can form a sparse network capable of relaying data between above ground and below ground units. The receiver 14 can have the ability to send low data rate communications to the above ground receiver. This can enable the remote control center to track the location of the positioning system receivers 14 underground and communicate with each receiver 14 operator.

Underground navigation and mapping can be conducted in multiple ways. In the back-packed configuration, a single operator can operate and carry the receiver 14 while exploring the underground environment. With the receiver 14 mounted on a vehicle, the vehicle operator can operate the positioning system 10 hands free while data is sent to the surface receiver. The hand held receiver 14 is attachable to the operator's equipment. The mobile control center can have the same graphic representation of the mapping and underground navigation as the underground operator.

Beyond geophysical exploration, other potential applications of the positioning system 10 concept include remote surveying of abandoned underground mines, natural cavern exploration and surveying, and underground mine and cavern rescue or similar uses. Moreover, this embodiment is not limited to underground applications, but can be applied in a variety of environments, including above ground locations. In particular, another embodiment will now be described in detail.

In traditional geophysical surveying using electromagnetic approaches, the presence of conductors near the source and receiver 14 can be minimized through careful collection planning. However in the positioning system 10, operational sites may have surface conductors near the locations where transmitters 12 are deployed. These conductors may be in the form of pipes, tunnel lining, and boreholes could be present throughout the area operated. The site could also include underground conductors near the field of the receiver 14. For navigational purposes, all of these are problematic and represent a significant source of noise which may impede the proper operation of the positioning system 10. The preferred embodiments described herein can address all of these functional elements: validation of theoretical models; development of magnetic field templates to support the location algorithms; and development of automated procedures for separating clutter from the direct transmitted signals.

For the positioning aspects of this system, this natural and man-made noise is a potential hindrance to the positioning system 10 performance. In another embodiment of this system 10 shown in FIG. 9, the noise is actually a source of useful signal information which can be analyzed to reveal significant or important information about the material composition and/or hydrology of the Earth surface 5 within the volume of influence of the positioning system 10 transmitters 12. Several different means are possible to alter the behavior and performance of the positioning system 10 to conduct investigation of the geophysical properties of subsurface materials.

VLF coherent magnetic scanning or strategic hardened facilities (SHF) and underground facilities (SHUF) provides an observer using the system 10 information on distribution of conductive materials and magnetic materials underground. The receiver 14 is able to distinguish a motor or generator from a stainless steel reactor or large piece of communication equipment. The system 10 can detect reinforced tunnels also. The system 10 can provide detailed information on what is behind radio frequency shielding that ground penetrating radar cannot. If the earth surface 5 is too conductive for ground penetrating radar to be useful, this embodiment allows detection of both reinforced and unreinforced tunnels.

Figure 9:
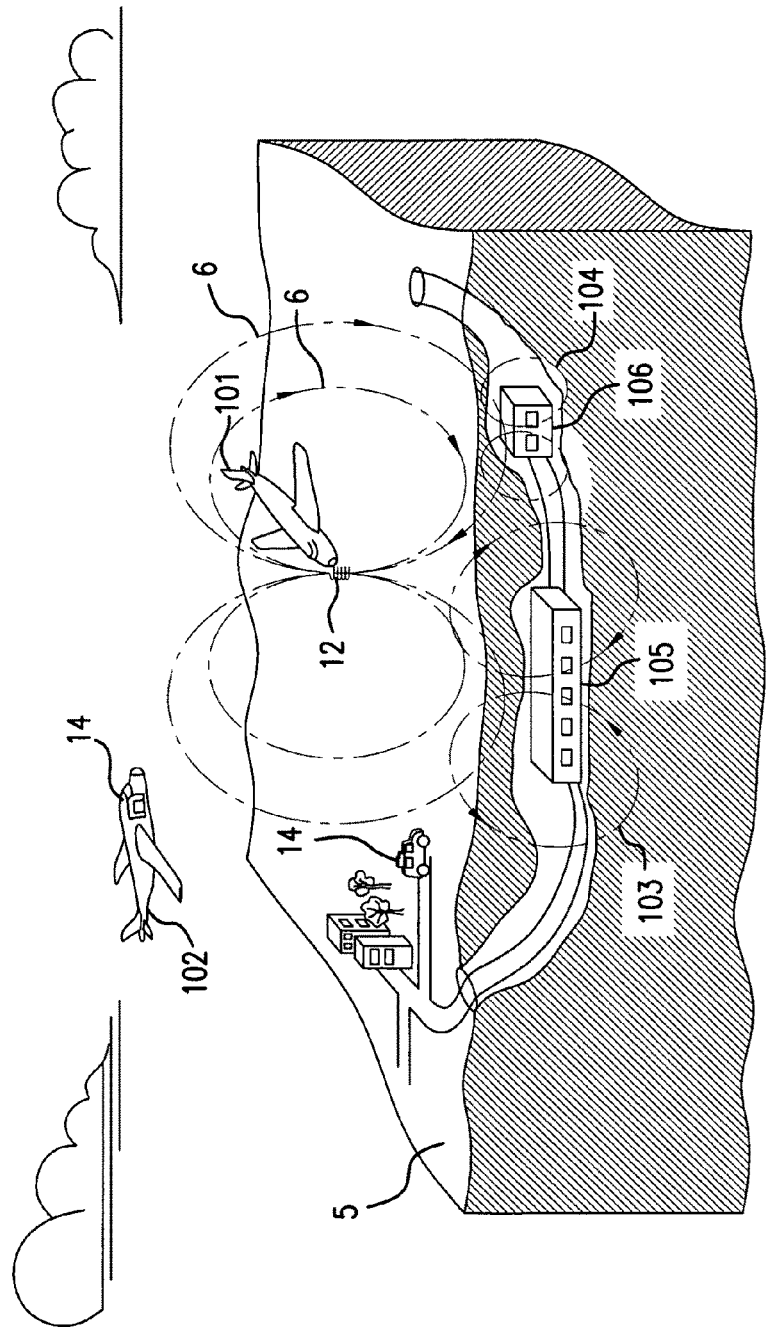
FIG. 9 shows a method of subsurface scanning in accordance with an embodiment.

The VLF coherent magnetic scanner is a combination of two or more vehicles 101 and 102, as shown in FIG. 9. Multiple transmitters 12 in the extremely low/very low/low frequency ranges are employed as the radio frequency magnetic field beacons. Depending on the desired information and specific access availability, similar transmitters 12 are also employed within the underground space and in vertical and/or horizontal boreholes. For geophysical applications, transmitters 12 can transmit either single frequency, swept frequency, or some other signal mode to simultaneously maximize location determination for receiver units 14 and provide enhanced data to support geophysical interpretations. Transmitter 12 locations and orientations are passed by a radio frequency link to a receiver 14 as set-up data 23 before the receiver 14 goes underground. The underground receiver unit 14 again comprises of a three-component receiver to detect the transmitters 12, other extremely low/very low/low frequency sources, and similar signals. The underground receiving unit 14 can also be employed above ground and/or in vertical or horizontal boreholes to enhance geophysical signature collections. Additional geophysical sensors can be deployed simultaneously to aid in the interpretation.

The two or more vehicles (e.g., remote controlled drones or surface vehicles) 101 and 102 carry a magnetic transmitter 12 and a receiver 14. A transmitter 12 is mounted on a first drone 101 and a receiver 14 is mounted on a second drone 102. The receiver 14 measures magnetic field values over a large area and attempts to measure the equivalent values of the induced fields 103, 104 generated by underground objects in the site of interest. The induced fields are related to the volume of magnetically active materials and thus the size and positions of underground objects 105, 106. The vehicles traverse the space above the site of interest intended to be scanned. The transmitter 12 generates a magnetic dipole reference field with an extremely stable frequency, e.g., synchronized to the GPS and well characterized magnetic field distribution. The receiver 14 measures in-phase and quadrature values of all three components of the magnetic field. All measurements are performed at frequencies around 1 kHz. The measurements are solved to determine the distribution of equivalent magnetic sources underground. The in-phase sources correspond to magnetic materials, e.g., motor generators. The quadrature sources correspond to conductive materials, such as aluminum structures, cables, etc.

This embodiment defeats conventional shielding techniques. The 1 kHz frequency makes the system relatively insensitive to poorly conductive elements such as reinforced concrete, minerals with high water content, etc. Conventional shielding techniques such as 1/16 inch thick copper sheet will not prevent probing using system 10 with very low frequency as described above. A user of the system 10 in this manner may increase the sensitivity to the conductive materials by increasing the frequency. Conversely, the user may decrease the frequency to decrease sensitivity to the environment. Use of primary frequencies below 10 kHz also minimizes potential interference from naturally occurring sources such as distant lightening storms which produce reduced noise levels in this frequency range.

This technique is different from geological magnetic sounding because it does not attempt to measure distribution of magnetic properties of subsurface materials. At very low frequencies primary and secondary magnetic fields may easily be separated. Induced eddy currents are orthogonal (in quadrature) to the magnetic field. Thus, the secondary magnetic field that they generate is in quadrature to the primary field. If the latter is small and tertiary effects can be neglected (i.e., low frequency or low conductivity), the in-phase and quadrature field measurements can separate primary and secondary magnetic fields, and thus, perturbations caused by ferromagnetic materials, e.g., steels, and conductive materials, e.g., copper and aluminum, can be detected.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modifications, though presently unforeseeable, of the present invention that come within the spirit and scope of the following claims should be considered part of the present invention.

What is claimed as new and desired to be protected by Letters Patent of the United States is:

1. A navigation system comprising:
   at least one transmitter comprising at least two magnetic dipoles, said transmitter being configured to generate a magnetic field; and
   a receiver comprising a magnetometer configured to receive input from said at least one transmitter; and
   wherein the transmitter is configured to change the magnetic dipoles' respective amplitudes according to one or more predetermined patterns, thereby producing associated signals;
   wherein the transmitter is configured to change the amplitude of a first magnetic dipole at a first frequency and the amplitude of a second magnetic dipole at a second frequency, where the first frequency is different from the second frequency;
   wherein the magnetic dipoles are configured to rotate around respective axes at a constant rate;
   wherein the associated signals are configured to rotate in a fixed plane; and
   wherein the receiver is configured to determine a bearing of the transmitter based on an orientation of the fixed plane.

2. The navigation system of claim 1, wherein the receiver is configured to identify each transmitter based upon differences between their associated signals.

3. A navigation system comprising:
   at least one transmitter comprising at least two magnetic dipoles, said transmitter being configured to generate a magnetic field; and
   a receiver comprising a magnetometer configured to receive input from said at least one transmitter; and
   wherein the transmitter is configured to change the magnetic dipoles' respective amplitudes according to one or more predetermined patterns, thereby producing associated signals;
   wherein the transmitter is configured to change the amplitude of a first magnetic dipole at a first frequency and the amplitude of a second magnetic dipole at a second frequency, where the first frequency is different from the second frequency;
   wherein the magnetic dipoles are configured to rotate around respective axes at a constant rate; and
   wherein the receiver is configured to determine the line of bearing to the transmitter based on the difference in orientation between at least the first magnetic dipole and the second magnetic dipole.

4. The navigation system of claim 3, wherein the receiver is configured to determine a distance to the transmitter based on amplitude signals of the magnetic dipoles.

5. A navigation system comprising:
   at least one transmitter comprising at least two magnetic dipoles, said transmitter being configured to generate a magnetic field; and
   a receiver comprising a magnetometer configured to receive input from said at least one transmitter; and
   wherein the transmitter is configured to change the magnetic dipoles' orientations at different respective frequencies; and
   wherein the transmitter further comprises a first clock, the receiver further comprises a second clock, wherein the first and second clocks are synchronized for use in signal detection.

6. The navigation system of claim 5, wherein the receiver synchronizes the second clock with the first clock based on a difference in the magnetic dipoles' orientations.

7. The navigation system of claim 5, wherein the magnetic dipoles are spinning dipoles.

8. The navigation system of claim 5, wherein the magnetic dipoles share a center of rotation.

9. The navigation system of claim 5, wherein the transmitter further comprises at least two non-coaxial magnetic coils for generating the magnetic field.

10. The navigation system of claim 5, wherein the transmitter further comprises at least three non-coaxial magnetic coils for generating the magnetic field.

11. The navigation system of claim 10 wherein at least one of the magnetic coils include a magnetic core.

12. The navigation system of claim 11 wherein the at least two magnetic coils share the same magnetic core.

13. The navigation system of claim 5, further comprising a device for determining a line of bearing of the receiver relative to the transmitter.

14. A navigation system, comprising:
a transmitter comprising at least two rotating, co-located magnetic dipoles, said co-located magnetic dipoles sharing an axis of rotation; and
a receiver comprising a magnetometer; and
wherein said receiver is configured to use a signal produced by the two rotating, co-located magnetic dipoles as a clock signal.

15. The navigation system of claim 14, wherein said at least two co-located magnetic dipoles are generated by two or more magnetic coils.

16. A navigation system, comprising:
a transmitter comprising at least two rotating, co-located magnetic dipoles, said co-located magnetic dipoles sharing an axis of rotation; and
a receiver comprising a magnetometer; and
wherein the receiver is configured to use a signal produced by the two rotating, co-located magnetic dipoles to obtain a line of bearing relative to the transmitter.

* * * * *